(12) United States Patent
Su

(10) Patent No.: US 9,185,126 B2
(45) Date of Patent: Nov. 10, 2015

(54) RISK PREDICTIVE ENGINE

(71) Applicant: Verizon Patent and Licensing Inc., Basking Ridge, NJ (US)

(72) Inventor: Yu Su, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 353 days.

(21) Appl. No.: 13/921,627

(22) Filed: Jun. 19, 2013

(65) Prior Publication Data

US 2014/0380422 A1    Dec. 25, 2014

(51) Int. Cl.
*H04L 29/06*    (2006.01)

(52) U.S. Cl.
CPC .................................. *H04L 63/1433* (2013.01)

(58) Field of Classification Search
USPC ............................................................ 726/4
See application file for complete search history.

(56) References Cited

U.S. PATENT DOCUMENTS

2005/0257267 A1* 11/2005 Williams et al. ................ 726/25
2012/0330817 A1* 12/2012 Brkic et al. ..................... 705/37

* cited by examiner

*Primary Examiner* — Tu Nguyen

(57) ABSTRACT

A method, a device, and a storage medium provide a risk engine that calculates a level of risk stemming from a communication to access a service or an asset. The risk engine operates as a fuzzy logic neural network. The risk engine obtains parameters from the communication and applies rules to calculate the level of risk.

20 Claims, 15 Drawing Sheets

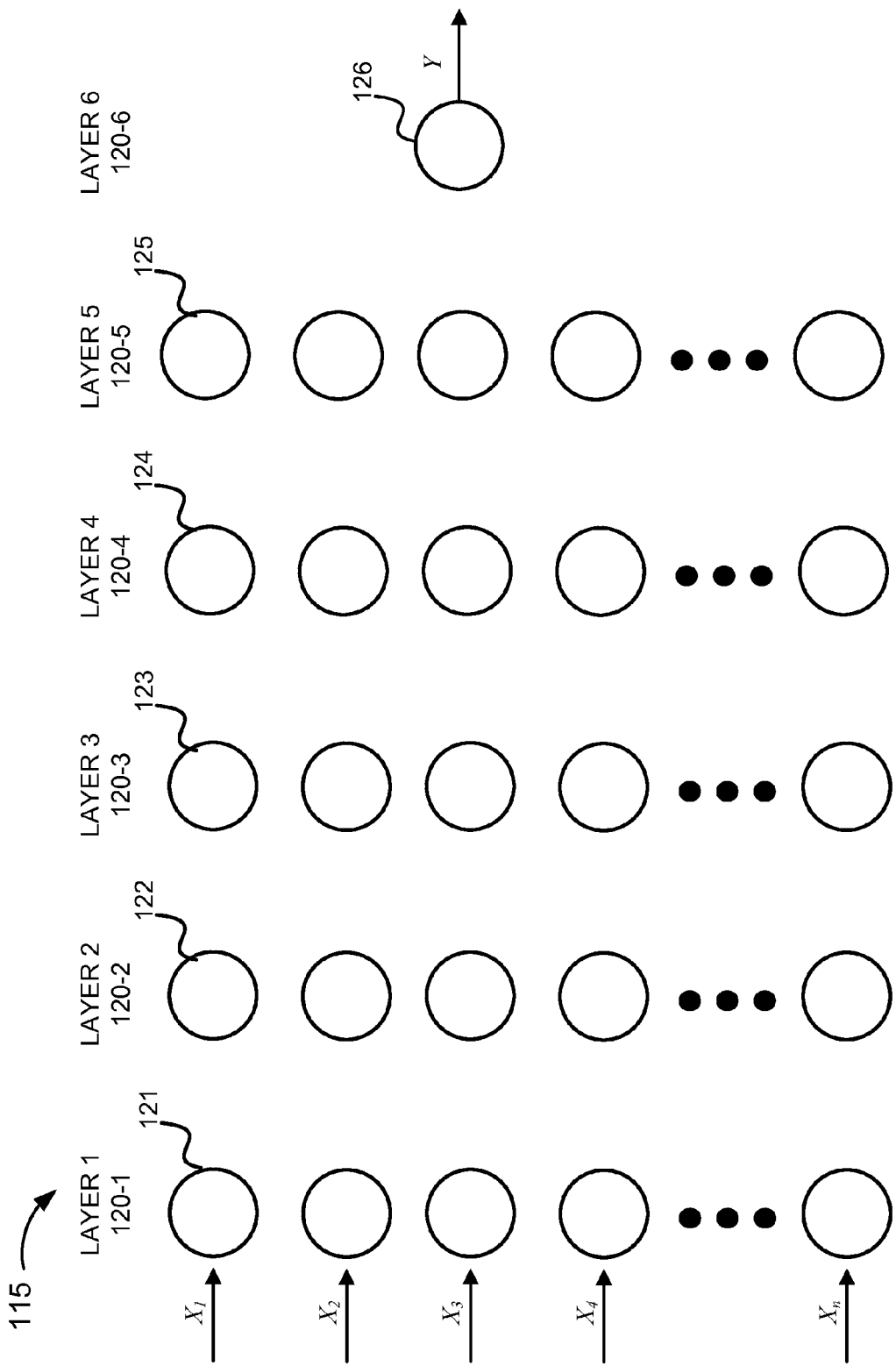

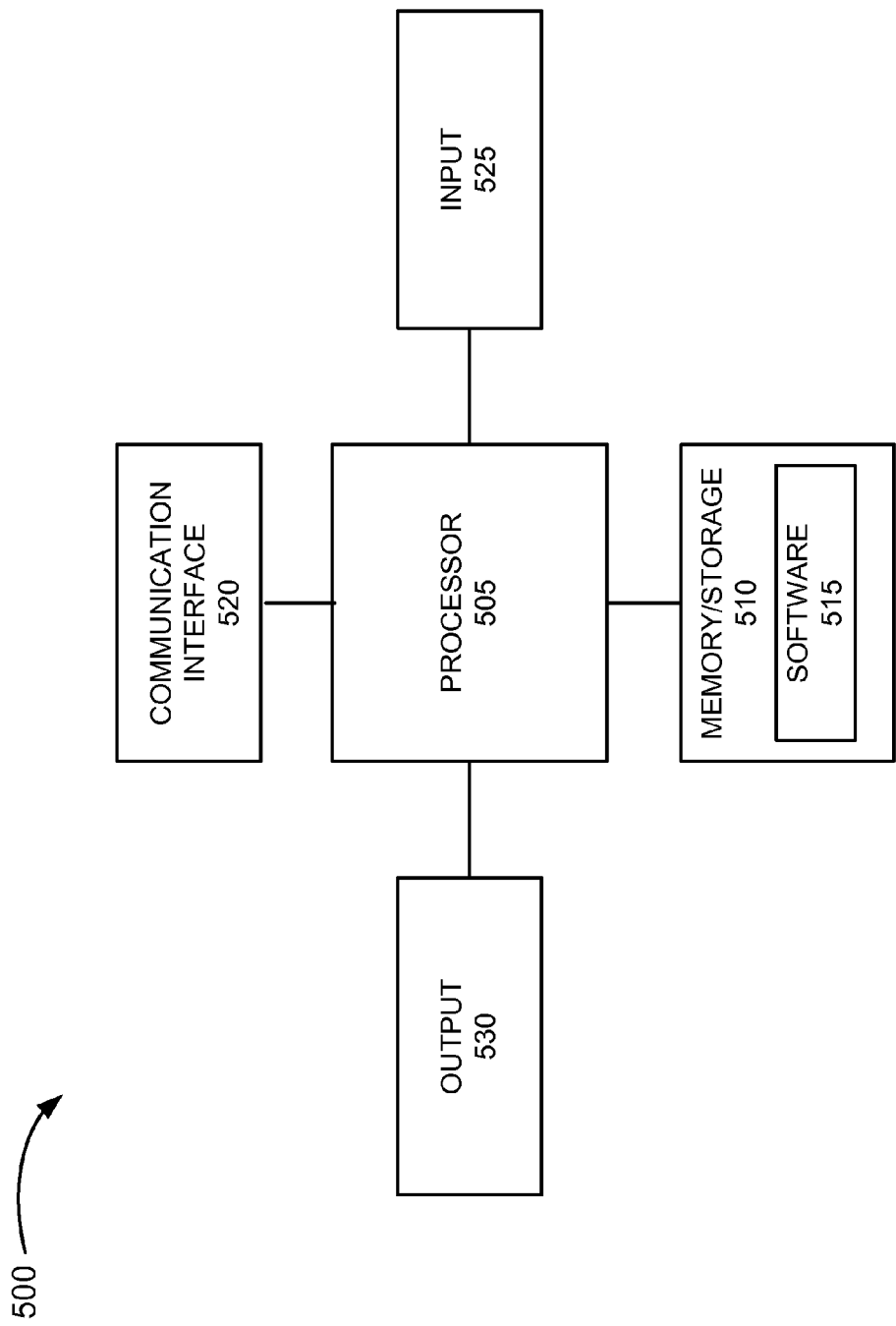

RISK PREDICTIVE ENGINE

BACKGROUND

User identity authentication and verification is a critical factor for many businesses. For example, users may wish to access an asset, such as a web site, an application, data, etc., offered by a service provider. The service provider relies on a security device to prevent an attack or misuse of the asset.

BRIEF DESCRIPTION OF THE DRAWINGS

FIG. 2 is a diagram illustrating an exemplary embodiment of the risk engine depicted in FIG. 1;

FIG. 5 is a diagram illustrating exemplary components of a device that may correspond to one or more of the devices depicted in the previous figures;

DETAILED DESCRIPTION OF PREFERRED EMBODIMENTS

The following detailed description refers to the accompanying drawings. The same reference numbers in different drawings may identify the same or similar elements.

According to an exemplary embodiment, a risk engine evaluates a risk associated with a request for an asset or a service. According to an exemplary embodiment, the risk engine comprises six layers of functionality which operate at the application layer. Each layer may be implemented by one or multiple network elements (also referred to as nodes) that include the logic, as described herein. A first layer includes logic that provides data preprocessing. A second layer includes logic to determine a degree to which an input satisfies a linguistic label associated with the node. A third layer includes logic in which a T-norm function computes a level of risk pertaining to an associated rule. A fourth layer includes logic that indicates a normalization of the input risk levels. A fifth layer includes logic that outputs a product of the normalized level of risk and the individual rule. A sixth layer includes logic that computes the overall system output as the sum of all incoming signals.

Figure 1:
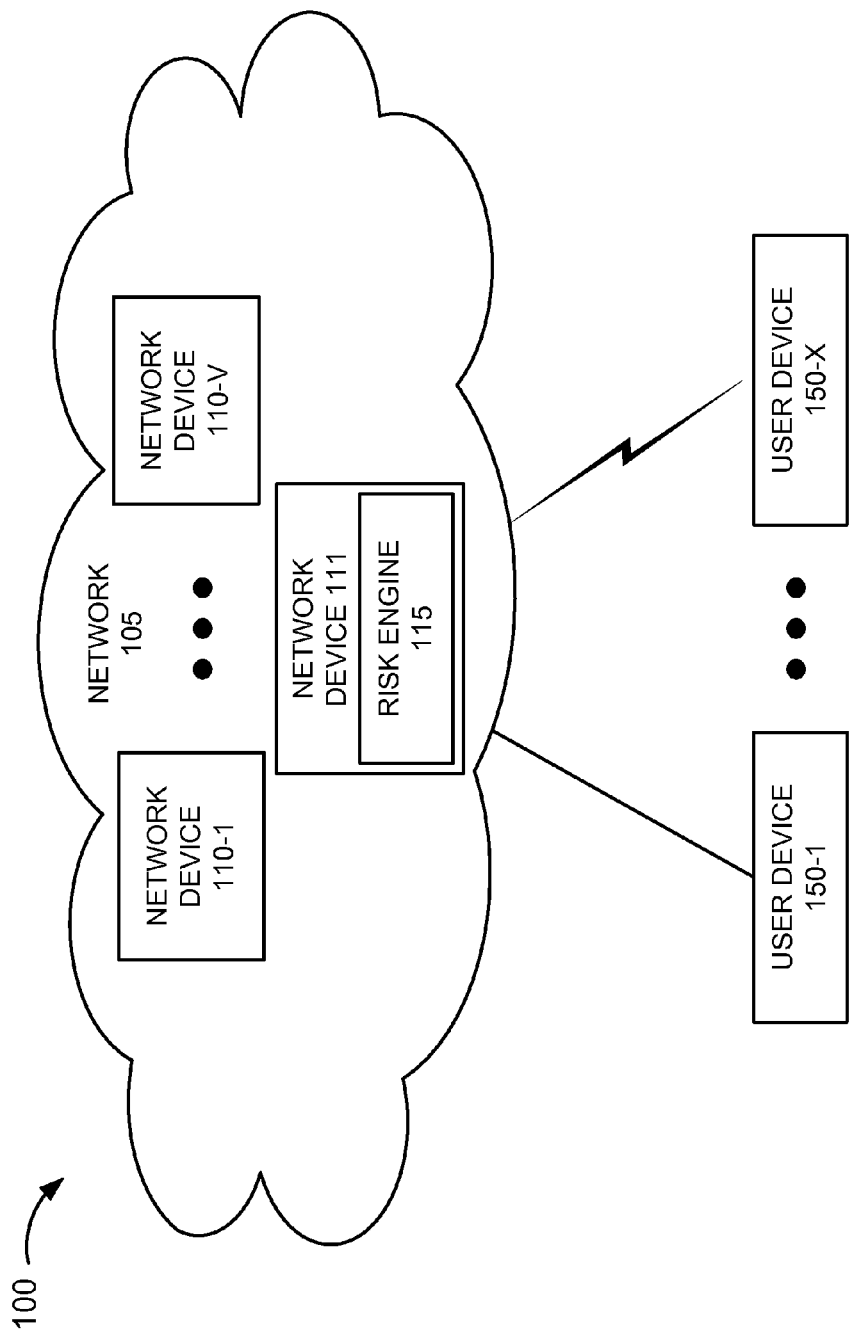
FIG. 1 is a diagram illustrating an exemplary environment in which an exemplary embodiment of a risk engine may be implemented.

FIG. 1 is a diagram illustrating an exemplary environment in which an exemplary embodiment of the risk engine may be implemented. As illustrated, an environment 100 includes a network 105. Network 105 includes network devices 110-1 through 110-V (also referred to collectively as network devices 110). Network 105 also includes a network device 111. As illustrated, network device 111 includes a risk engine 115. Environment 100 also includes user devices 150-1 through 150-X (also referred to collectively as user devices 150).

Environment 100 may be implemented to include wired and/or wireless connections among the devices and network illustrated. A connection may be direct or indirect and may involve intermediary device(s) and/or network(s) not illustrated in FIG. 1. The number of network devices 110 and the number of network device 111 are exemplary.

Network 105 includes one or multiple networks of one or multiple types. For example, network 105 may include the Internet, a wide area network, a private network, a public network, an intranet, an enterprise network, a local area network, an access network, a packet-switched network, a wired network (e.g., an optical network, a cable network, etc.), a wireless network (e.g., a mobile network, a cellular network, a non-cellular network, etc.), a cloud network, a data network, a computer network, etc. Network 105 may operate according to various protocols, communication standards, platforms, etc.

Network devices 110 include elements (e.g., logic) that provide a service or an asset. Network devices 110 may be implemented as, for example, cloud devices, application server devices, web server devices, media devices, program storage devices, or other types of devices that provide or make available the service, asset, etc.

Network device 111 includes a network device that hosts risk engine 115 or a portion thereof. Network device 111 may be implemented as, for example, a cloud device, an application server, a web server device, a computer, a gateway device, a security device, or other suitable type of network device.

Risk engine 115 includes an element that grants or denies access to users, customers, or other entities (e.g., devices relating to machine-to-machine communication, etc.) of the service or the asset provided by network devices 110. According to an exemplary embodiment, risk engine 115 calculates a risk of a request to access and/or use the service or the asset. According to an exemplary embodiment, risk engine 115 assesses risk based on a hybrid fuzzy neural network architecture, which is described further below. According to an exemplary embodiment, risk engine 115 verifies the identity of an individual or a device. According to an exemplary embodiment, risk engine 115 authenticates an individual or a device. Risk engine 115 is described further below.

User device 150 includes an end device. For example, user device 150 may be implemented as a mobile device (e.g., a smartphone, a tablet, a netbook, etc.), a computer (e.g., a desktop computer, a laptop computer, etc.), a communication system in a vehicle, a kiosk, or other device capable of accessing and using the service or asset provided by network devices 110.

A device (e.g., user device 150, network device 110, and network device 111) may be implemented according to one or multiple network architectures (e.g., a client device, a server device, a peer device, a proxy device, or some combination thereof). Also, according to other embodiments, one or more functions and/or processes described as being performed by a particular device may be performed by a different device, or some combination of devices, which may or may not include the particular device.

FIG. 2 is a diagram illustrating an exemplary embodiment of risk engine 115. Risk engine 115 includes layers one through six, which are illustrated as layer 1 120-1, layer 2 120-2, layer 3 120-3, layer 4 120-4, layer 5 120-5, and layer 6 120-6 (also referred to collectively as layers 120). Each of layers 120 includes one or multiple nodes (depicted as circles). As an example, layer 1 120-1 includes nodes 121; layer 2 120-2 includes nodes 122; layer 3 120-3 includes nodes 123; layer 4 120-4 includes nodes 124; layer 5 120-5 includes nodes 125; and layer 6 120-6 includes node 126.

Each node includes a function. Although not illustrated, a node of one layer may connect or communicate to a node of another layer. By way of example, a set of variables $X=\{x_1, x_2, \ldots, x_n\}$ is received by layer 1 120-1 of risk engine 115, in which n is the number of variables. The set of variables are processed by layers 120 and Y is output by layer 6 120-6 of risk engine 115. Layers 120 operate at the application layer. A description of the variables used by risk engine 115 and the functions associated with nodes of layers 120 are described further below.

The number of layers 120 of risk engine 115 is exemplary. The functions of nodes described herein are exemplary and may be modified based on the particular service or asset being accessed via network device 111 and/or other parameters, not specifically described, which lend themselves to enhance the security service provided by risk engine 115. For example, the functions of nodes 121 at layer 1 120-1 of risk engine 115 may vary depending on the variables $X=\{x_1, x_2, \ldots, x_n\}$ that are received by nodes 121 of layer 1 120-1. Given a property (e.g., of a communication, such as a request), a function of a node 121 at layer 1 120-1 may quantify the property to a numerical value. Any function that can quantitatively describe the given property can be used as a membership function at layer 1 120-1. Some examples of functions at layer 1 120-1 are a linear function, a step function, a Gaussian function, and a Sigmoid function. As far as the property, a particular communication may include a variable that lends itself to the assessment of risk.

While exemplary embodiments provided in this description may be implemented based on the use of a particular network architecture, platform, etc., such implementations are not intended to be restrictive or provide an exhaustive treatment, as such. In other words, the embodiments described herein may be implemented using other suitable network architectures, platforms, etc., which may not be specifically described.

The security service provided by risk engine 115 uses multiple variables to evaluate risk, verify the individual or entity, use the service or asset of network devices 110, or provide some other type of security measure, as described herein. For example, risk engine 115 may receive a request to access or use the security service or the service or asset of network devices 110. A description of exemplary variables used by risk engine 115 is described below. The use of the word "user" may refer to an individual and/or a device. The use of the word "request," in this description, refers to any type of message of a communication. For example, a request may be implemented as or correspond to various types of messages (e.g., request, response, post, invite, etc.) that may be communicated between user device 150 and network 105.

A first variable pertains to Internet Protocol (IP) address frequency. Currently, most attacks are designed based on sending high frequency requests, such as brute force and denial-of-service attacks. If the IP addresses, which send requests to the security service of risk engine 115, are monitored—malicious IP addresses and requests can be identified. To identify these IP addresses, let δt denote the time difference between a current request and a previous request from an IP address, as expressed in equation (1).

$$\delta t = t_c - t_p \tag{1}$$

Given an IP address, $t_c$ indicates a timestamp of the current request and $t_p$ indicates a timestamp of the previous request. δt provides a time interval between two adjacent requests. However, δt fails to describe a long term observation. That is, a user could quickly initiate a series of requests via a user interface for accessing the service or the asset, which results in a small δt. In this regard, one or several small values of δt may not constitute an attack. However, if a sequence of requests having small values of δt are identified as coming from one or multiple IP addresses, then it is very likely that these requests are malicious. To address this problem, an IP frequency accumulate function may be expressed as:

$$f_{n+1} = g(\delta t) + f_n(1 - u(\delta t)), \tag{2}$$

in which g(δt) is an incremental function and u(δt) is a punish function. g(δt) and u(δt) may be defined by the following exemplary equations.

$$g(\delta t) = \frac{2e^{-\beta_1 \delta t}}{1 + e^{-\beta_1 \delta t}} \tag{3}$$

$$u(\delta t) = \begin{cases} \frac{2}{1 + e^{(\alpha - \delta t)\beta_2}} - \left(1 - \frac{\delta t}{\alpha}\right)\frac{2}{1 + e^{\alpha\beta_2}} & \text{if } \delta t < \alpha \\ 1 & \text{if } \delta t \geq \alpha \end{cases} \tag{4}$$

$\beta_1$ and $\beta_2$ are the slope coefficients and α is a constant in equations (3) and (4). To map the accumulate function f into fuzy logic, a membership function $\mu_1(x)$ is used, wherein this membership function maps [0,∞) to [0,1). The membership function may be expressed as:

$$\mu_1(x) = \frac{1 - e^{-\beta \mu_1 x}}{1 + e^{-\beta \mu_1 x}} \tag{5}$$

A second variable pertains to user request frequency. For example, given a user, let δt' denote a random variable pertaining to a time difference between two adjacent requests made by this user. Based on the central limit theorem, the mean of a large number of δt' is approximately normally distributed. The mean μ of this normal distribution may be the average response time. The mean μ should have a reasonable value because of speed limitations associated with human or machine response. If the user sends continuous requests with very small values of δt', network device 111 (e.g., risk engine 115) should raise an alert because the continuous requests may constitute a brute force attack. Since the signature of continuous requests is similar with IP address frequency detection, the accumulate function expressed in equation (2) and the membership function expressed in equation (5) may be used. However, the slope coefficients βs may have different values from the values used for IP address frequency detection.

A third variable pertains to user requests per hour. For example, this variable indicates time intervals (e.g., hours, half-hours, a day, etc.) that the user prefers to use the service or the asset of network devices 110. By way of example, assume network devices 110 provide a medical-related service. The user may prefer to sign electronic prescriptions (e-prescriptions) during the afternoon. The user may access the service via risk engine 115. Equation (6) represents a matrix $A_{n,m}$. For example, for a certain user, $a_{i,j}$ is an accumulated number of requests that happened during [i−1,i) hour at the j th day.

$$A_{n,m} = \begin{pmatrix} a_{1,1} & a_{1,2} & \cdots & a_{1,m} \\ a_{2,1} & a_{2,2} & \cdots & a_{2,m} \\ \vdots & \vdots & \ddots & \vdots \\ a_{n,1} & a_{n,2} & \cdots & a_{n,m} \end{pmatrix}, \quad (6)$$

where n=7 and m=24. The variable n indicates from Sunday to Saturday, and the variable m indicates 24 hours a day. The membership function input is defined as $$x_{i,j} = \frac{a_{i,j}}{\sum a_{i,j}}.$$

Since $A_{n,m}$ may be a sparse matrix, the same membership function, as expressed in equation (5), with different values of slope coefficients β, may be used.

A fourth variable pertains to the days that a user prefers to use the service of network devices 110. For example, a user may prefer using the service to sign e-prescriptions on Monday but not on Saturday. As expressed by an exemplary equation (7), a vector $B_n$ is defined, in which n 1≤n≤7 indicates from Sunday to Saturday and $b_i = \sum_{j=1}^{24} a_{i,j}$.

$$B_n = (b_1 \, b_2 \ldots b_n) \quad (7)$$

The same membership function of equation (5) may be used with different values of slope coefficients βs. The input variable is $$x_i = \frac{b_i}{\sum b_i}.$$

Given a user, assume ($t_1, t_2, t_3, \ldots$) are the time intervals between requests occurring within a user session. The mean and standard deviation of response time may be defined as follows:

$$\bar{t} = \frac{\sum_{i=1}^{n} t_i}{n}; \quad (8)$$

and $$\sigma_t = \sqrt{\frac{\sum_{i=1}^{n}(t_i - \bar{t})^2}{n}}. \quad (9)$$

The incremental formats of mean and standard deviation of response time are given as follows:

$$\bar{t}'' = \frac{n}{n+1}\bar{t}' + \frac{t_{n+1}}{n+1}; \quad (10)$$

and $$\sigma_t'' = \sqrt{\frac{n\sigma_t'^2 + (t_{n+1} - \bar{t}'')^2}{n+1}}, \quad (11)$$

in which $\sigma_t''$ is an approximate standard deviation because the exact value of the mean is not known before the coming response time $t_{n+1}$ is known.

The fifth variable pertains to the location of the user. For example, given a user, risk engine 115 captures IP addresses of the requests. These IP addresses can be converted to geolocations to learn the user's patterns. For example, the geolocation dataset may be represented as {($GL_1,T_1,N_1$), ($GL_2,T_2,N_2$), ...}, in which $GL_i$ indicates the geolocation; $T_i$ indicates the time interval hour, which has the same index as the matrix expressed in equation (6); and $N_i$ is the number of requests. $GL_i$ can be interpreted as (longitude, latitude).

A tolerance radius may be considered since there may be an error when converting an IP address to a geolocation (e.g., longitude, latitude). According to an exemplary implementation, a two-dimensional Gaussian function may be used, as expressed in equation (12), to calculate a certainty pertaining to the expected geolocations. For the sake of description, let (x, y) denote the geolocation (e.g., longitude, latitude) converted from the IP address. The two-dimensional Gaussian function may be expressed as:

$$f_{g2d}(x, y) = A \cdot \exp\left(-\left(\frac{(x-x_0)^2}{2\sigma_x^2} + \frac{(y-y_0)^2}{2\sigma_y^2}\right)\right), \quad (12)$$

in which ($x_1, y_0$) is the mean of (x, y); ($\sigma_x, \sigma_y$) is the standard deviation of (x, y); and A is a constant (e.g., A=1). Given a user, ($x_0, y_0$) and ($\sigma_x, \sigma_y$) may be calculated in an incremental manner. The exemplary equations (13) and (14), as expressed below, provide the format of incremental mean and standard deviation, in which an incremental standard deviation that may calculated by equation (14) is an approximate calculation.

$$x_{0''} = \frac{n}{n+1}x_{0'} + \frac{x_{n+1}}{n+1} \quad (13)$$

$$\sigma_x' = \sqrt{\frac{n\sigma_x'^2 + (x_{n+1} - x_{0''})^2}{n+1}} \quad (14)$$

To evaluate the certainty of the expected geolocations, a determination may be made as to whether the geolocation is a new geolocation. That is, a given location can theoretically be assigned to an expected location ($x_0, y_0$) with a positive membership value. Therefore, a tolerance radius ε may be used. Based on the central limit theorem, the mean of a large number of (x, y) is approximately normally distributed. This implies that, based on the three-sigma rule, if $\epsilon = k\sqrt{\sigma_x^2 + \sigma_y^2}$, then the area centered at ($x_0, y_0$) with a radius $\epsilon = k\sqrt{\sigma_x^2 + \sigma_y^2}$ should almost cover one hundred percent of the requests sent from this location (k≥3). Additionally, if d((x, y), ($x_0, y_0$)) $<\epsilon = k\sqrt{\sigma_x^2 + \sigma_y^2}$, then ($x_0, y_0$) and ($\sigma_x, \sigma_y$) may need to be recalculated by the incremental functions previously expressed by equations (13) and (14). $N_i$ may be set as $N_i = N_i + 1$. Based on the foregoing, the membership function of geolocation is defined according to the exemplary expression:

$$\mu_2(x, y, p) = \frac{1 - e^{-\beta_{\mu_2} p}}{1 + e^{-\beta_{\mu_2} p}} \cdot \exp\left(-\left(\frac{(x-x_0)^2}{2\sigma_x^2} + \frac{(y-y_0)^2}{2\sigma_y^2}\right)\right), \quad (15)$$

in which $\beta_{\mu_2}$ is a slope coefficient;

$$p = \max\left(\frac{N_i}{\sum_{T_i=c} N_i}, \frac{N_i}{\sum N_i}\right) \cdot \frac{N_i}{\sum_{T_i=c} N_i}$$

is defined as request frequency per hour, and $$\frac{N_i}{\sum N_i}$$

is defined as request frequency per day.

As previously described, the geolocation dataset may be represented as $\{(GL_1,T_1,N_1),(GL_2,T_2,N_2),\ldots\}$. Given a user, assume $t_\Delta$ is the time difference and $d_\Delta$ is the geolocation distance of two adjacent requests. A moving speed may be defined as $$s = \frac{d_\Delta}{t_\Delta}.$$

The membership function of equation (5) with different values of slope coefficients $\beta$ may be used for calculating a level of risk. By way of example, if a user sends one request from a location in Massachusetts, and five minutes later, the same user sends another request from a location in California, this presents an impossibility due to the limitations of an individual traveling between these two location within five minutes (i.e., the moving speed).

A sixth variable pertains to the frequency a user updates his or her profile. For example, a user should not frequently update his or her profile. In this regard, the time intervals between two adjacent operations, which include a user updating, resetting, adding, or deleting his or her username, password, e-mail address, phone number, home address, or security questions, may be monitored. If these fields change frequently, this type of behavior exhibits a high risk. By way of the same concepts described in relation to IP address frequency and user request frequency, the accumulate function of equation (2), but with different slope coefficients ($\beta_1$ and $\beta_2$) and a constant, may be used. The output of the accumulate function then may provide an input to the membership function of equation (5) so as to calculate a membership value.

One-time password (OTP) devices are used as a second criterion to verify a one-time password. For example, a one-time password is a password that is valid for a single user session or request. Some examples of OTP devices are mobile devices (e.g., smartphones, tablets, etc.), computers, or other suitable end user device. The one-time password may be transmitted to the OTP device in the form of various messages (e.g., an e-mail, a text message, etc.) and may incorporate various technologies (e.g., hardware/software token, etc.). If a user updates or changes his or her OTP device frequently, risk engine 115 may determine that an increased level or risk is present. Provided below are descriptions of exemplary scenarios pertaining to this issue.

According to an exemplary use case, assume a user updates (e.g., modifies, adds, deletes, etc.) his or her OTP device. If the user updates his or her OTP device too frequently, risk engine 115 raises an alert (e.g., assigns a level of risk). To evaluate the frequency of updating the OTP device, the accumulate function of equation (2) and the membership function of equation (5) may be used to calculate the level of risk pertaining to updating the OTP device.

According to another exemplary use case, assume a user changes his or her OTP device to verify the one-time password. If the user verifies the one-time password by using different OTP devices at an unusual frequency, risk engine 115 raises an alert. An accumulate function may be expressed according to equation (16) as follows:

$$f_{n+1} = d_{n,n+1} + f_n(1 - u(\delta t)), \quad (16)$$

where $u(\delta t)$ is defined by punish equation 4; and $d_{n,n+1}$ is defined as:

$$d_{n,n+1} = \quad (17)$$
$$\begin{cases} 0 & \text{if they are the same } OTP \text{ device when } t = n \text{ and } n+1 \\ 1 & \text{if they are different } OTP \text{ devices when } t = n \text{ and } n+1. \end{cases}$$

The output of the accumulation function of equation (16) may be used as the input to the membership function of equation (5) so as to calculate the level of risk pertaining to the changing of OTP devices.

According to yet another exemplary scenario, assume a user types the wrong one-time password continuously. Under such a circumstance, risk engine 115 raises an alert. The time difference between two adjacent, incorrectly typed one-time passwords may be defined as $\delta t$. Then, the accumulate function of equation (2) and the membership function of equation (5) may be used to calculate the level or degree of risk for this case.

A given IP address could be a public address or a private address. For example, public IP addresses are IP addresses that are visible to the public and private IP addresses are not routable through the public Internet. For IPv4, these private IP addresses range as follows:

10.0.0.0 through 10.255.255.255.
169.254.0.0 through 169.254.255.255 (APIPA only).
172.16.0.0 through 172.31.255.255.
192.168.0.0 through 192.168.255.255.

Usually, a private IP address is used by one user. However, multiple users may share a single public IP address. By way of example, multiple users may be located in an Intranet with different private IP addresses but access the Internet via a single point (e.g., a router). An observer standing outside of this Intranet can see only a single public IP address for all these users located in the Intranet. This situation raises a problem if risk engine 115 only monitors request frequency for a given IP address. That is, a high frequency of requests, as previously described, may not be a sufficient condition to indicate a malicious IP address. The reason is that multiple users could generate a continuous request stream from a public IP address. A simple solution is to distinguish the public IP addresses and the private IP addresses since the segments of IP addresses are known, as indicated by the list above. However, this approach may introduce several problems.

For example, one problem is that IPv4 and IPv6 have different public and private IP segments. These differences may result in complexities. For example, the use of if-else-then structures in the logic of risk engine 115 to identify segments may require extensive recoding or recompiling if any version changes pertaining to the segments occur. Another problem is that hard coding public and private IP addresses cannot prevent IP camouflage attacks.

In view of the above, the frequency of requests from a given IP address is problematic in terms of determining risk since there are issues related to whether the IP address is a public IP address or a private IP address. Besides the variable of request frequency from a given IP address, another variable to distinguish malicious IP addresses may be added, which shall be described as idle or unsuccessful requests.

Idle or unsuccessful request (IUSR) may be defined as follows: any request with incomplete or incorrect login information, or legal or illegal nonsensical inputs. An example of a legal nonsensical input is a Transmission Control Protocol (TCP)/IP ping, which generates a request stream but without initiating any meaningful security service operation. For risk engine 115, the following exemplary cases may be deemed as an idle or an unsuccessful request. However, these exemplary cases are not intended to be exhaustive, and other cases not specifically described herein may be envisioned.

Case I: a request with an undefined data format. For example, assume network device 111 (e.g., risk engine 115) is unable to read or parse Extensible Markup Language (XML). Risk engine 115 receives a request that includes XML. Risk engine 115 is unable to read or parse the XML.

Case II: a request with incomplete fields. For example, assume risk engine 115 receives a request that includes an incomplete field or a missing required field. For example, a request may include a username but no password or a request may include a password but no username.

Case III: a request with unexpected data formats. For example, assume risk engine 115 receives a request that includes data in a date field having a non-date format, data in a string field having too long of a string; data in a numerical field having nonnumeric values, etc.

Case IV: a request asking for information without doing any further operations. For example, risk engine 115 receives a request that causes a user interface to keep loading without any further operation. According to other examples, the request may provide user login without initiating any further operations or provides an update to a user profile without any further meaningful operation being initiated, etc.

The accumulate function of equation (2) may be used to measure the frequency of idle or unsuccessful requests. As previously described, the input of the accumulate function is defined as $\delta t = t_c - t_p$, in which $t_p$ is a previous idle or unsuccessful request time stamp and $t_c$ is a current idle or unsuccessful request time stamp. The output of the accumulate function may be used as the input to membership function of equation (5) to calculate fuzzy membership values.

As previously described, risk engine 115 includes providing a function $f(X) \rightarrow Y$, in which the input is $X = (x_1, x_2, \ldots, x_n)$ and the output is defined as $Y = y$. X is a vector that contains the features of a request. For purposes of description, the range of Y may be [0,100], in which if y has a value close to 100, then a high risk exists, and if y has a value close to 0, then a low risk exists. For mid-range values of y, then a mid-level risk exists. Given a certain value of y, risk engine 115 may be configured to provide an appropriate security response, such as grant access to the service or asset of network devices 110, deny access, require further challenges, etc.

Provided below are a list of fuzzy if-then rules that may be used by risk engine 115 to assess risk. The term "high," as used in these rules may correspond to a value above a threshold value.

$R_1$: If frequency of requests coming from a certain IP address is high and frequency of IUSRs is high, then risk is high.

$R_2$: If frequency of requests coming from a certain user is high, then risk is high.

$R_3$: If user uses the service at an unusual location, then risk is above the medium level.

$R_4$: If user uses the service at an unusual time and operation time (mean and standard deviation) is unusual, then risk is above the medium level.

$R_5$: If user moving speed is unusual, then risk is high.

$R_6$: If frequency of updating or changing profiles from a certain user is high, then risk is high.

$R_7$: If OTP devices are updated too frequently, then risk is high.

$R_8$: If OTP verification continuously fails multiple times, then risk is high.

$R_9$: If user changes OTP devices to verify OTP too frequently, then risk is high.

$R_{10}$: Let $Cond_i$ represent the condition of the i th Rule. If the frequency of idle or unsuccessful requests is low based on opposite conditions existing in relation to rules 2, 5, 6, 7, 8, and 9, then risk is low.

Figure 3A:
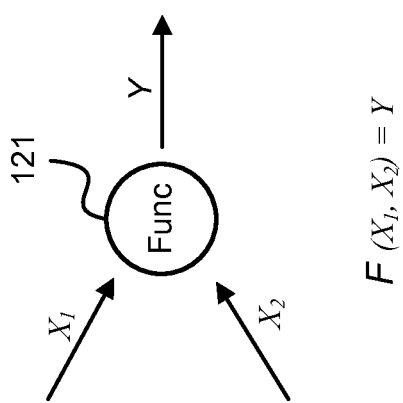
FIG. 3A is a diagram illustrating the concept of a member function.

As previously described in relation to FIG. 2, each node includes a function. Input is given by the incoming edges and output is placed at the outgoing edges. FIG. 3A is a diagram illustrating the concept of a member function. Node 121 receives inputs $X_1$ and $X_2$, applies a function (Func), and outputs Y. The hybrid fuzzy neural network is composed of multiple layer-structured nodes. Referring back to FIG. 2, layer 1 120-1 may be referred to as the input layer and layer 6 120-6 may be referred to as the output layer. Layer 2 120-2 through layer 5 120-5 may be referred as hidden layers.

The input layer is used to receive the input and the output layer is used to output the results. In this description, there are two types of nodes. For the sake of simplicity, one type of node is referred to as a square node. The square node has parameters that are unknown but are derivable through training. Another type of node is referred to as a circle node. The circle node does not have this type of parameter (i.e., unknown but derivable through training).

A description of exemplary nodes for layers 120 are described below. The number of nodes of a particular layer 120 is exemplary. Additionally, a function associated with each node is exemplary and may be modified based on other parameters and/or rules not specifically described herein, which may be applied so as to provide the security service.

Figure 3B:
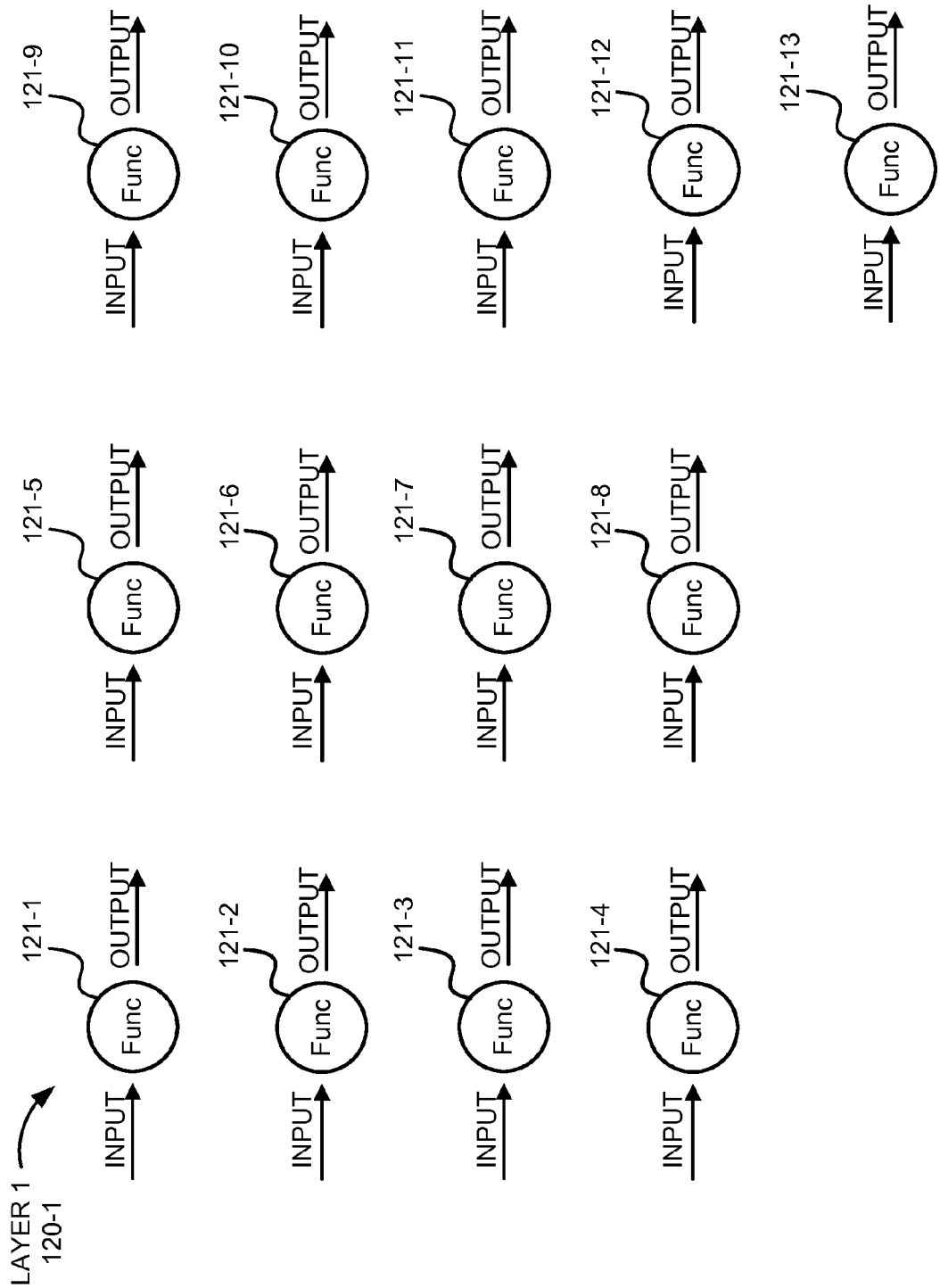
FIG. 3B is a diagram illustrating nodes of a layer 1 of the risk engine.

According to an exemplary embodiment, layer 1 120-1 includes nodes 121-1 through 121-13 (also referred to collectively as nodes 121). Nodes 121 receive the input $X = (x_1, x_2, \ldots, x_{11})$. Since the fuzzy neural network of risk engine 115 cannot directly use the input X, layer 1 120-1 includes these data preprocessing nodes 121. FIG. 3B is a diagram illustrating nodes 121 of layer 1 120-1. Each node 121 of layer 1 120-1 includes a data preprocessing function $f(x) \rightarrow y$. Each node 121 is described below in terms of input, functionality, and output. Depending on the type of request, one or more inputs, as described below, may not be received or obtained. According to an exemplary implementation, risk engine 115 may use a default value for the input. For example, node 121-11 includes an input relating to whether the typed one-time password is correct. However, risk engine 115 may receive a request that does not include the one-time password. Thus, risk engine 115 may use a default value. According to this example, risk engine 115 may use a value associated with another request received during a login process.

Referring to FIG. 3B, node 121-1 operates as follows:

Input: (IPaddress,$t_c$), in which the IP address is the source of a request; $t_c$ indicates the timestamp of when the request is received.

Functionality: Node 121-1 manages a data structure that is organized as [key, value], which is [IP,(AI,$t_p$)], in which $t_p$ is the timestamp of a previous request coming from this IP address and AI is calculated as follows.

$$\delta t = t_c - t_p \tag{18}$$

$$AI_{n+1} = g(\delta t) + AI_n(1 - u(\delta t)) \tag{19}$$

$$g(\delta t) = \frac{2e^{-\beta_1 \delta t}}{1 + e^{-\beta_1 \delta t}} \tag{20}$$

$$u(\delta t) = \begin{cases} \frac{2}{1 + e^{(\alpha + \delta t)\beta_2}} - \left(1 - \frac{\delta t}{\alpha}\right)\frac{2}{1 + e^{\alpha \beta_2}} & \text{if } \delta t < \alpha \\ 1 & \text{if } \delta t \geq \alpha \end{cases} \tag{21}$$

Output: AI, in which AI includes a value indicating a frequency of requests received within a given timeframe. Additionally, AI is calculated for each IP address.

Node 121-2 operates as follows:

Input: (userID, $t_c$), in which the userID indicates the user's identity; $t_c$ indicates the timestamp of when the request is received.

Functionality: Node 121-2 manages a data structure that is organized as [key, value], which is [userID,(AU,$t_p$)], in which $t_p$ is the timestamp of a previous request coming from this userID and AU is calculated as follows.

$$\delta t = t_c - t_p \quad (22)$$

$$AU_{n+1} = g(\delta t) + AU_n(1 - u(\delta t)) \quad (23)$$

$$g(\delta t) = \frac{2e^{-\beta_1 \delta t}}{1 + e^{-\beta_1 \delta t}} \quad (24)$$

$$u(\delta t) = \begin{cases} \frac{2}{1 + e^{(\alpha - \delta t)\beta_2}} - \left(1 - \frac{\delta t}{\alpha}\right)\frac{2}{1 + e^{\alpha \beta_2}} & \text{if } \delta t < \alpha \\ 1 & \text{if } \delta t \geq \alpha \end{cases} \quad (25)$$

Output: AU, in which AU includes a value indicating a frequency of requests associated with the same user, which are received within a given timeframe.

Node 121-3 operates as follows:

Input: userID indicates the user's identity.

Functionality: Node 121-3 manages a matrix for each user formatted as $$A_{n,m} = \begin{pmatrix} a_{1,1} & a_{1,2} & \ldots & a_{1,m} \\ a_{2,1} & a_{2,2} & \ldots & a_{2,m} \\ \vdots & \vdots & \ddots & \vdots \\ a_{n,1} & a_{n,2} & \ldots & a_{n,m} \end{pmatrix}, \quad (26)$$

in which n=7 and m=24. n indicates from Sunday to Saturday and m indicates 24 hours a day. For a certain user, $a_{i,j}$ is an accumulated number of requests that happened during [i−1,i) hour at the j th day. For instance, if a user sends a request to during [i−1,i) hour at the j th day, then $a_{i,j}=a_{i,j}+1$.

Output:

$$p_{i,j} = \frac{a_{i,j}}{\sum a_{i,j}},$$

in which $p_{i,j}$ indicates the probability of receiving a request from the user in view of a given time interval (e.g., within a certain hour of a certain day).

Node 121-4 operates as follows:

Input: userID indicates the user's identity.

Functionality: Node 121-4 manages a vector for each user formatted as in which n=7, which indicates from Sunday to Saturday. If a user sends a request on the i th day, then $b_i=b_i+1$.

Output:

$$p_i = \frac{b_i}{\sum b_i},$$

where $b_i = \sum_{j=1}^{24} a_{i,j}$, in which indicates the probability of receiving a request from the user in view of a given time interval (e.g., a certain day).

Node 121-5 operates as follows:

Input: (userID, $t_c$, is_one_session). userID indicates the user's identity; $t_c$ is a time stamp of when the request is received; is_one_session indicates if the request is received within one session.

Functionality: Node 121-5 manages a data structure formatted as [userID,($\bar{t},\sigma_t,n,t_p$)], where $\bar{t}$ is a mean of the response time (e.g., a time difference between two adjacent requests within a session); $\sigma_t$ is the standard deviation of the response time. n is an accumulated number which is defined as n=n+1 for each request. $\bar{t}$ is updated as $$\bar{t} = \frac{n}{n+1}\bar{t} + \frac{t_d}{n+1}, \quad (28)$$

where $t_d$ is the time difference between two adjacent requests within a session, $t_d=t_c-t_p$. Node 121-5 stores the time stamp $t_p$ of a previous request within a session, which is indicated by is_one_session. Then $\sigma_t$ is updated as $$\sigma_t = \sqrt{\frac{n\sigma_t^2 + (t_d - \bar{t})^2}{n+1}}. \quad (29)$$

Output: Based on the central limit theorem, assume that $\bar{t}$ is approximately normally distributed. Therefore, the output may be defined as $$p = \exp\left(-\frac{1}{2}\left(\frac{(t_d - \bar{t})}{\sigma_t}\right)^2\right), \quad (30)$$

in which p includes a value indicating a degree of certainty that the user is the user based on the time difference between two adjacent requests within a session. For example, the value of p takes into account historically data pertaining to the user's behavior (e.g., in terms of the time difference between adjacent requests). According to an exemplary implementation, p may have a value of one, indicating a high degree of certainty that the user is the user that corresponds to the user identifier. Conversely, p may have a value close to zero, indicating a high degree of certainty that the user is not the user that corresponds to the user identifier.

Node 121-6 operates as follows:

Input: [userID, (x, y)]. userID indicates the user's identity. For example, let (x, y) denote the value of (longitude,latitude), where (longitude,latitude) indicates the current user location.

Functionality: Node 121-6 manages a data structure that is formatted as [userID,tp,($\bar{x},\bar{y},\sigma_x,\sigma_y,n$)], where n is an accumulated number which is defined as n=n+1 for each request; tp is a timestamp of a previous request coming from this userID. $\bar{x}$ may be computed as $$\bar{x} = \frac{n}{n+1}\bar{x} + \frac{x}{n+1}. \quad (31)$$

$\sigma_x$ may be computed as $$\sigma_x = \sqrt{\frac{n\sigma_x^2 + (x - \bar{x})^2}{n+1}}. \quad (32)$$

$\bar{x}$ indicates a mean coordinate (e.g., longitude). $\sigma_x$ indicates a standard deviation of the x-coordinate. $\bar{y}$ may be computed in a similar manner in accordance with a modified equation (31) and $\sigma_y$ may be computed in a similar manner in accordance with a modified equation (32).

Output: Based on the central limit theorem, assume that $\bar{x}$ and $\bar{y}$ are approximately normally distributed. Therefore, the output may be defined as $$f_{g2d}(x, y) = A \cdot \exp\left(-\left(\frac{(x-\bar{x})^2}{2\sigma_x^2} + \frac{(y-\bar{y})^2}{2\sigma_y^2}\right)\right), \quad (33)$$

in which $f_{g2d}$ (x, y) includes a value indicating a degree of assurance that the user corresponds to the user identifier based on the geolocation of the user from which the request is sent. For example, assume that an error exists in relation to the geolocation (e.g., due to GPS constraints, etc.) of a user. In this regard, a geographic region (e.g., a circle that defines a region with respect to a center) may represent the geographic location of the user for which the error may be accounted. The output of node 121-6 provides a value indicating the degree of assurance that the user corresponds to the user identifier in relation to the geographic region (e.g., a circle). By way of example, if the user is determined to be located near the boundary of the circle, then the degree of assurance may be less than if the user is determined to be located near the center of the circle.

Node 121-7 operates as follows:

Input: [userID, (x, y), $t_c$]. userID indicates the user's identity. Let (x, y) denote the value of geolocation (longitude, latitude); $t_c$ is a time stamp.

Functionality: Node 121-7 manages a data structure that is formatted as [userID,($x_p$, $y_p$), $t_p$], where $t_p$ indicates the time stamp of a previous request and ($x_p$, $y_p$) is the geolocation of previous request.

Output:

$$S = \frac{D_{c,p}}{\delta t}, \quad (34)$$

where $D_{c,p}$ is a distance between (x, y) and ($x_p$, $y_p$) and $\delta t = t_c - t_p$. S is a speed of the user moving.

Node 121-8 operates as follows:

Input: [userID, $t_c$]. userID indicates the user's identity. $t_c$ is a time stamp of a request that indicates that the user updates, resets, adds, or deletes his or her username, password, e-mail, phone number, home address, or security questions.

Functionality: Node 121-8 manages a data structure that is organized as [key, value], which is [userID, (AP, $t_p$)], where $t_p$ is the timestamp of a previous request to update, reset, add, or delete his or her username, password, e-mail, phone number, home address, or security questions and AP is calculated as follows.

$$\delta t = t_c - t_p \quad (35)$$

$$AP_{n+1} = g(\delta t) + AP_n(1 - u(\delta t)) \quad (36)$$

$$g(\delta t) = \frac{2e^{-\beta_1 \delta t}}{1 + e^{-\beta_1 \delta t}} \quad (37)$$

$$u(\delta t) = \begin{cases} \frac{2}{1+e^{(\alpha-\delta t)\beta_2}} - \left(1 - \frac{\delta t}{\alpha}\right)\frac{2}{1+e^{\alpha\beta_2}} & \text{if } \delta t < \alpha \\ 1 & \text{if } \delta t \geq \alpha \end{cases} \quad (38)$$

Output: AP, in which AP includes a value indicating a frequency of requests to modify the user's profile within a given timeframe.

Node 121-9 operates as follows:

Input: [userID, $t_c$]. userID indicates user's identity. $t_c$ is a time stamp of a request that indicates that the user updates, adds, or deletes his or her OTP devices.

Functionality: Node 121-9 manages a data structure that is organized as [userID, (AO, $t_p$)], where $t_p$ is the timestamp of a previous request that updates, adds, or deletes his or her OTP devices and AO is calculated as follows.

$$\delta t = t_c - t_p \quad (39)$$

$$AO_{n+1} = g(\delta t) + AO_n(1 - u(\delta t)) \quad (40)$$

$$g(\delta t) = \frac{2e^{-\beta_1 \delta t}}{1 + e^{-\beta_1 \delta t}} \quad (41)$$

$$u(\delta t) = \begin{cases} \frac{2}{1+e^{(\alpha-\delta t)\beta_2}} - \left(1 - \frac{\delta t}{\alpha}\right)\frac{2}{1+e^{\alpha\beta_2}} & \text{if } \delta t < \alpha \\ 1 & \text{if } \delta t \geq \alpha \end{cases} \quad (42)$$

Output: AO, in which AO includes a value indicating a frequency of requests to modify the user's OTP devices.

Node 121-10 operates as follows:

Input: [userID, OTPdevice, $t_c$]. userID indicates the user's identity. OTPdevice indicates the OTP device that the user currently uses and $t_c$ is a timestamp.

Functionality: Node 121-10 manages a data structure that is organized as [userID, PreviousOTPdevice, $t_p$, AOU], where PreviousOTPdevice is the OTP device that user used last time. $t_p$ is the timestamp when the user uses the OTP device last time. AOU is calculated as follows.

$$AOU_{n+1} = df + AOU_n(1 - u(\delta t)) \quad (43)$$

$$df = \begin{cases} 0 & \text{if OTPdevice = PreviousOTPdevice} \\ 1 & \text{if OTPdevice != PreviousOTPdevice} \end{cases} \quad (44)$$

$$\delta t = t_c - t_p \quad (45)$$

$$u(\delta t) = \begin{cases} \frac{2}{1+e^{(\alpha-\delta t)\beta_2}} - \left(1 - \frac{\delta t}{\alpha}\right)\frac{2}{1+e^{\alpha\beta_2}} & \text{if } \delta t < \alpha \\ 1 & \text{if } \delta t \geq \alpha \end{cases} \quad (46)$$

Output: AOU, in which AOU includes a value indicating a frequency of requests to change the user's OTP device.

Node 121-11 operates as follows:

Input: [userID,OTPaccept,$t_c$]. userID indicates the user's identity. OTPaccept may be a Boolean variable that indicates whether the typed OTP is correct or not. $t_c$ is a timestamp.

Functionality: Node 121-11 manages a data structure that is organized as [userID,$t_p$,AOA], where $t_p$ is a timestamp that indicates that last time the user types the OTP. AOA is calculated as follows.

$$AOA_{n+1} = doa + AOA_n(1 - u(\delta t)) \quad (47)$$

$$doa = \begin{cases} 0 & \text{if OTP is correct} \\ 1 & \text{if OTP is wrong} \end{cases} \quad (48)$$

$$\delta t = t_c - t_p \quad (49)$$

-continued $$u(\delta t) = \begin{cases} \frac{2}{1+e^{(\alpha-\delta t)\beta_2}} - \left(1 - \frac{\delta t}{\alpha}\right)\frac{2}{1+e^{\alpha\beta_2}} & \text{if } \delta t < \alpha \\ 1 & \text{if } \delta t \geq \alpha \end{cases} \quad (50)$$

Output: AOA, in which AOA includes a value indicating a frequency of one-time password failures over a given timeframe.

Node 121-12 operates as follows:

Input: [IPaddress,IUSRaccept,$t_c$]. IUSTaccept may be a Boolean variable which indicates whether the request is an idle or unsuccessful request or not. $t_c$ is a timestamp.

Functionality: Node 121-12 manages a data structure that is organized as [IPaddress,$t_p$,AOI], where $t_p$ is a timestamp that indicates the last time an IUSR happens for this IP address. AOI is calculated as follows.

$$\delta t = t_c - t_p \quad (51)$$

$$AOI_{n+1} = g(\delta t) + AOI_n(1 - u(\delta t)) \quad (52)$$

$$g(\delta t) = \frac{2e^{-\beta_1 \delta t}}{1+e^{-\beta_1 \delta t}} \quad (53)$$

$$u(\delta t) = \begin{cases} \frac{2}{1+e^{(\alpha-\delta t)\beta_2}} - \left(1 - \frac{\delta t}{\alpha}\right)\frac{2}{1+e^{\alpha\beta_2}} & \text{if } \delta t < \alpha \\ 1 & \text{if } \delta t \geq \alpha \end{cases} \quad (54)$$

Output: AOI, in which AOI includes a value indicating a frequency of requests, from a given IP address, which are idle or unsuccessful, over a given timeframe.

Node 121-13 operates as follows:

Input: [userID,(x, y)]. userID indicates the user's identity. (x, y) denotes the value of (longitude,latitude), where (longitude,latitude) indicates the current user location.

Functionality: Node 121-13 manages a data structure that is organized as [userID,(x,y),N], where N represents the total number of request times that have happened between risk engine 115 and user userID. p indicates the user probability of the geolocation (x, y).

$$p = \frac{N+1}{\sum N} \quad (55)$$

Output: p, in which p includes a value indicating a probability that the user is the user corresponding to the user identifier based on the current geolocation of the user.

Figure 3C:
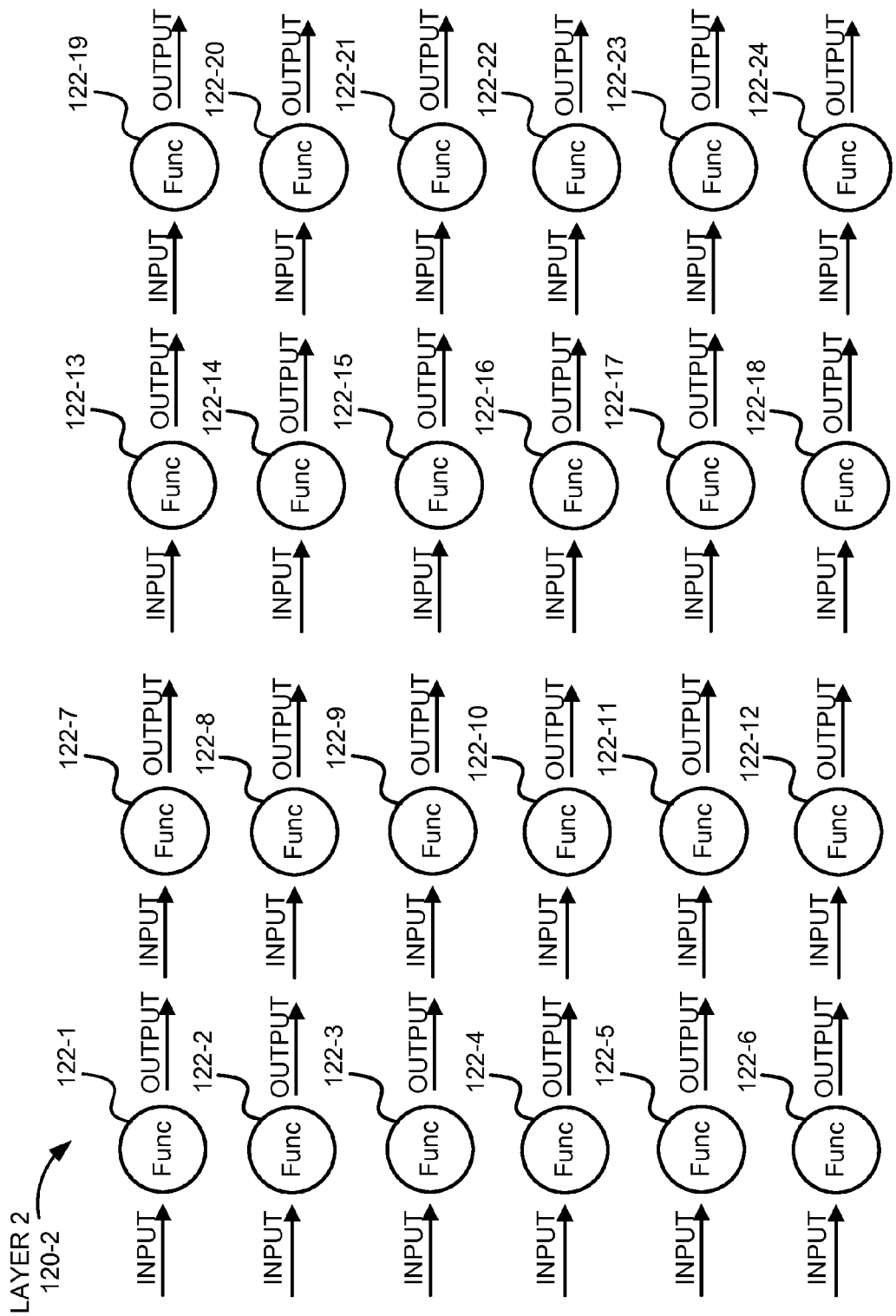
FIG. 3C is a diagram illustrating nodes of a layer 2 of the risk engine.

A description of layer 2 120-2 of risk engine 115 is provided below. According to an exemplary embodiment, layer 2 120-2 includes nodes 122-1 through 122-24 (also referred to collectively as nodes 122). FIG. 3C is a diagram illustrating nodes 122. Every node i in layer 2 is a square node with a node function $$O_i = \mu_{A_i}(x) \quad (56)$$

where x is the input to node i, and $A_i$ is the linguistic label associated with this node's function. $O_i$ is the membership function of $A_i$ and it specifies the degree to which the given x satisfies the quantifier $A_i$. Table 1 gives a summary of nodes 122 of layer 2 120-2.

TABLE 1

| Layer 1 | Layer 2 | Node Function | Parameters | Notes |
|---|---|---|---|---|
| 121-1 | 122-1 | $\mu_{A_1}(x) = \frac{1-e^{-\beta_{A_1^x}}}{1+e^{-\beta_{A_1^x}}}$ | $\beta_{A_1}$ | $\mu_{A_1} + \mu_{A_2} = 1$ |
|  | 122-2 | $\mu_{A_2}(x) = \frac{2e^{-\beta_{A_1^x}}}{1+e^{-\beta_{A_1^x}}}$ |  |  |
| 121-2 | 122-3 | $\mu_{A_3}(x) = \frac{1-e^{-\beta_{A_3^x}}}{1+e^{-\beta_{A_3^x}}}$ | $\beta_{A_3}$ | $\mu_{A_3} + \mu_{A_4} = 1$ |
|  | 122-4 | $\mu_{A_4}(x) = \frac{2e^{-\beta_{A_3^x}}}{1+e^{-\beta_{A_3^x}}}$ |  |  |
| 121-3 | 122-5 | $\mu_{A_5}(x) = \frac{1-e^{-\beta_{A_5^x}}}{1+e^{-\beta_{A_5^x}}}$ | $\beta_{A_5}$ | $\mu_{A_5} + \mu_{A_6} = 1$ |
|  | 122-6 | $\mu_{A_6}(x) = \frac{2e^{-\beta_{A_5^x}}}{1+e^{-\beta_{A_5^x}}}$ |  |  |
| 121-4 | 122-7 | $\mu_{A_7}(x) = \frac{1-e^{-\beta_{A_7^x}}}{1+e^{-\beta_{A_7^x}}}$ | $\beta_{A_7}$ | $\mu_{A_7} + \mu_{A_8} = 1$ |
|  | 122-8 | $\mu_{A_8}(x) = \frac{2e^{-\beta_{A_7^x}}}{1+e^{-\beta_{A_7^x}}}$ |  |  |
| 121-5 | 122-9 | $\mu_{A_9}(x) = \frac{1-e^{-\beta_{A_9^x}}}{1+e^{-\beta_{A_9^x}}}$ | $\beta_{A_9}$ | $\mu_{A_9} + \mu_{A_{10}} = 1$ |
|  | 122-10 | $\mu_{A_{10}}(x) = \frac{2e^{-\beta_{A_9^x}}}{1+e^{-\beta_{A_9^x}}}$ |  |  |
| 121-6 ($x_2$) | 122-11 | $\mu_{A_{11}}(x_1, x_2) = x_2 \cdot \frac{1-e^{-\beta_{A_{11}^{x_1}}}}{1+e^{-\beta_{A_{11}^{x_1}}}}$ | $\beta_{A_{11}}$ | $\mu_{A_{11}} + \mu_{A_{12}} = 1$ |
| 121-13 ($x_1$) | 122-12 | $\mu_{A_{12}}(x_1, x_2) = 1 - x_2 \cdot \frac{1-e^{-\beta_{A_{11}^{x_1}}}}{1+e^{-\beta_{A_{11}^{x_1}}}}$ |  |  |
| 121-7 | 122-13 | $\mu_{A_{13}}(x) = \frac{1-e^{-\beta_{A_{13}^x}}}{1+e^{-\beta_{A_{13}^x}}}$ | $\beta_{A_{13}}$ | $\mu_{A_{13}} + \mu_{A_{14}} = 1$ |
|  | 122-14 | $\mu_{A_{14}}(x) = \frac{2e^{-\beta_{A_{13}^x}}}{1+e^{-\beta_{A_{13}^x}}}$ |  |  |
| 121-8 | 122-15 | $\mu_{A_{15}}(x) = \frac{1-e^{-\beta_{A_{15}^x}}}{1+e^{-\beta_{A_{15}^x}}}$ | $\beta_{A_{15}}$ | $\mu_{A_{15}} + \mu_{A_{16}} = 1$ |
|  | 122-16 | $\mu_{A_{16}}(x) = \frac{2e^{-\beta_{A_{15}^x}}}{1+e^{-\beta_{A_{15}^x}}}$ |  |  |

TABLE 1-continued

| Layer 1 | Layer 2 | Node Function | Parameters | Notes |
|---|---|---|---|---|
| 121-9 | 122-17 | $\mu_{A_{17}}(x) = \dfrac{1 - e^{-\beta_{A_{17}}^x}}{1 + e^{-\beta_{A_{17}}^x}}$ | $\beta_{A_{17}}$ | $\mu_{A_{17}} + \mu_{A_{18}} = 1$ |
|  | 122-18 | $\mu_{A_{18}}(x) = \dfrac{2e^{-\beta_{A_{17}}^x}}{1 + e^{-\beta_{A_{17}}^x}}$ |  |  |
| 121-10 | 122-19 | $\mu_{A_{19}}(x) = \dfrac{1 - e^{-\beta_{A_{19}}^x}}{1 + e^{-\beta_{A_{19}}^x}}$ | $\beta_{A_{19}}$ | $\mu_{A_{19}} + \mu_{A_{20}} = 1$ |
|  | 122-20 | $\mu_{A_{20}}(x) = \dfrac{2e^{-\beta_{A_{19}}^x}}{1 + e^{-\beta_{A_{19}}^x}}$ |  |  |
| 121-11 | 122-21 | $\mu_{A_{21}}(x) = \dfrac{1 - e^{-\beta_{A_{21}}^x}}{1 + e^{-\beta_{A_{21}}^x}}$ | $\beta_{A_{21}}$ | $\mu_{A_{21}} + \mu_{A_{22}} = 1$ |
|  | 122-22 | $\mu_{A_{22}}(x) = \dfrac{2e^{-\beta_{A_{21}}^x}}{1 + e^{-\beta_{A_{21}}^x}}$ |  |  |
| 121-12 | 122-23 | $\mu_{A_{23}}(x) = \dfrac{1 - e^{-\beta_{A_{23}}^x}}{1 + e^{-\beta_{A_{23}}^x}}$ | $\beta_{A_{23}}$ | $\mu_{A_{23}} + \mu_{A_{24}} = 1$ |
|  | 122-24 | $\mu_{A_{24}}(x) = \dfrac{2e^{-\beta_{A_{23}}^x}}{1 + e^{-\beta_{A_{23}}^x}}$ |  |  |

Referring to Table 1, the first column indicates nodes 121 of layer 1 120-1 that provide input to layer 2 120-2. The second column indicates nodes 122 of layer 2 120-2. Referring to row one of Table 1, the output of node 121-1 of layer 1 120-1 serves as the input to nodes 122-1 and 122-2 of layer 2 120-2. Similarly, in the next row, the output of node 121-2 of layer 1 120-1 serves as the input to nodes 122-3 and 122-4 of layer 2 120-2, and so on.

The third column of Table 1 indicates the functions of nodes 122. The fourth column of Table 1 indicates a parameter β. A value for parameter β is not initially known and is obtained from training data, as described further below. In this regard, nodes 122 constitute square nodes, as previously described. As illustrated in the third column, for each node function, parameter β is present. Additionally, parameter β is associated with a linguistic label. For example, referring to the node functions of nodes 122-1 and 122-2, the $A_1$ of $\beta_{A_1}$ corresponds to the linguistic label of frequency of requests from a certain IP address is high.

The fifth column of Table 1 indicates a normalized value of risk (e.g., 1) which is calculated based on the summation of node pairs of layer 2, as indicated. By way of example, $\mu_{A_1} + \beta_{A_2} = 1$ is calculated by the output of node 122-1 and node 122-2 having applied their respective node functions.

A description of nodes 122 of layer 2 120-2 are described further below. Node 122-1 operates as follows.

Linguistic label $A_1$: Frequency of requests coming from a certain IP address is high.

Membership function $O_i$:

$$\mu_{A_1}(x) = \dfrac{1 - e^{-\beta_{A_1}^x}}{1 + e^{-\beta_{A_1}^x}} \tag{57}$$

Output: value is between 0 and 1 indicating a degree of the linguistic label $A_1$. For example, the output would have a value of 1 when the frequency of requests coming from a certain IP address is high. Conversely, the output would have a value of 0 when the frequency of requests coming from a certain IP address is low.

Node 122-2 operates as follows.

Linguistic label $A_2$: Frequency of requests coming from a certain IP address is low.

Membership function $O_2$:

$$\mu_{A_2}(x) = \dfrac{2e^{-\beta_{A_1}^x}}{1 + e^{-\beta_{A_1}^x}}, \tag{58}$$

where $\mu_{A_1}(x) + \mu_{A_2}(x) = 1, \forall x \in [0, \infty)$.

Output: value is between 0 and 1 indicating a degree of the linguistic label $A_2$.

Node 122-3 operates as follows.

Linguistic label $A_3$: Frequency of requests coming from a certain user is high.

Membership function $O_3$:

$$\mu_{A_3}(x) = \dfrac{1 - e^{-\beta_{A_3}^x}}{1 + e^{-\beta_{A_3}^x}} \tag{59}$$

Output: value is between 0 and 1 indicating a degree of the linguistic label $A_3$.

Node 122-4 operates as follows.

Linguistic label $A_4$: Frequency of requests coming from a certain user is low.

Membership function $O_4$:

$$\mu_{A_4}(x) = \dfrac{2e^{-\beta_{A_3}^x}}{1 + e^{-\beta_{A_3}^x}}, \tag{60}$$

where $\mu_{A_3}(x) + \mu_{A_4}(x) = 1, \forall x \in [0, \infty)$.

Output: value is between 0 and 1 indicating a degree of the linguistic label $A_4$.

Node 122-5 operates as follows.

Linguistic label $A_5$: Frequency of requests per hour for a certain user is high.

Membership function $O_5$:

$$\mu_{A_5}(x) = \dfrac{1 - e^{-\beta_{A_5}^x}}{1 + e^{-\beta_{A_5}^x}} \tag{61}$$

The domain of input x is [0,1].

Output: value is between 0 and 1 indicating a degree of the linguistic label $A_5$.

Node 122-6 operates as follows.

Linguistic label $A_6$: Frequency of requests per hour for a certain user is low.

Membership function $O_6$:

$$\mu_{A_6}(x) = \frac{2e^{-\beta_{A_5^x}}}{1+e^{-\beta_{A_5^x}}}, \tag{62}$$

where $\mu_{A_5}(x)+\mu_{A_6}(x)=1, \forall x \in [0,1]$. The domain of input x is [0,1].

Output: value is between 0 and 1 indicating a degree of the linguistic label $A_6$.

Node 122-7 operates as follows.

Linguistic label $A_7$: Frequency of requests per day for a certain user is high.

Membership function $O_7$:

$$\mu_{A_7}(x) = \frac{1-e^{-\beta_{A_7^x}}}{1+e^{-\beta_{A_7^x}}} \tag{63}$$

The domain of input x is [0,1].

Output: value is between 0 and 1 indicating a degree of the linguistic label $A_7$.

Node 122-8 operates as follows.

Linguistic label $A_8$: Frequency of requests per day for a certain user is low.

Membership function $O_8$:

$$\mu_{A_8}(x) = \frac{2e^{-\beta_{A_7^x}}}{1+e^{-\beta_{A_7^x}}}, \tag{64}$$

where $\mu_{A_7}(x)+\mu_{A_8}(x)=1, \forall x \in [0,1]$. The domain of input x is [0,1].

Output: value is between 0 and 1 indicating a degree of the linguistic label $A_8$.

Node 122-9 operates as follows.

Linguistic label $A_9$: The deviation of response time for a certain user is low.

Membership function $O_9$:

$$\mu_{A_9}(x) = \frac{1-e^{-\beta_{A_9^x}}}{1+e^{-\beta_{A_9^x}}} \tag{65}$$

The domain of input x is [0,1].

Output: value is between 0 and 1 indicating a degree of the linguistic label $A_9$.

Node 122-10 operates as follows.

Linguistic label $A_{10}$: The deviation of response time for a certain user is high.

Membership function $O_{10}$:

$$\mu_{A_{10}}(x) = \frac{2e^{-\beta_{A_9^x}}}{1+e^{-\beta_{A_9^x}}}, \tag{66}$$

where $\mu_{A_9}(x)+\mu_{A_{10}}(x)=1, \forall x \in [0,1]$. The domain of input x is [0,1].

Output: value is between 0 and 1 indicating a degree of the linguistic label $A_{10}$.

Node 122-11 operates as follows.

Linguistic label $A_{11}$: The deviation of geolocation for a certain user is low.

Membership function $O_{11}$:

$$\mu_{A_{11}}(x_1, x_2) = x_2 \cdot \frac{1-e^{-\beta_{A_{11}^{x_1}}}}{1+e^{-\beta_{A_{11}^{x_1}}}}. \tag{67}$$

Node 122-11 receives two input variables, where $x_1$ and $x_2$ are given by nodes 121-13 and 121-6.

$$p = \frac{N_i}{\sum N_i}, \tag{68}$$

$$x_2 = f_{g2d}(x,y) = A \cdot \exp\left(-\left(\frac{(x-\bar{x})^2}{2\sigma_x^2} + \frac{(y-\bar{y})^2}{2\sigma_y^2}\right)\right) \tag{69}$$

Output: value is between 0 and $x_2$ indicating a degree of the linguistic label $A_{11}$. The variable $x_2$ comes from node 121-6.

Node 122-12 operates as follows.

Linguistic label $A_{12}$: The deviation of geolocation for a certain user is high.

Membership function $O_{12}$:

$$\mu_{A_{12}}(x_1, x_2) = 1 - x_2 \cdot \frac{1-e^{-\beta_{A_{11}^{x_1}}}}{1+e^{-\beta_{A_{11}^{x_1}}}} \tag{70}$$

Node 122-13 receives two input variables, where $x_1$ and $x_2$ are given by nodes 121-13 and 121-6.

$$p = \frac{N_i}{\sum N_i}, \tag{71}$$

$$x_2 = f_{g2d}(x,y) = A \cdot \exp\left(-\left(\frac{(x-\bar{x})^2}{2\sigma_x^2} + \frac{(y-\bar{y})^2}{2\sigma_y^2}\right)\right) \tag{72}$$

Output: value is $(1-x_2)$ indicating a degree of the linguistic label $A_{12}$.

Node 122-13 operates as follows.

Linguistic label $A_{13}$: The speed of user moving is high.

Membership function $O_{13}$:

$$\mu_{A_{13}}(x) = \frac{1-e^{-\beta_{A_{13}^x}}}{1+e^{-\beta_{A_{13}^x}}} \tag{73}$$

Output: value is between 0 and 1 indicating a degree of the linguistic label $A_3$.

Node 122-14 operates as follows.

Linguistic label $A_{14}$: The speed of the user moving is low.

Membership function $O_{14}$:

$$\mu_{A_{14}}(x) = \frac{2e^{-\beta_{A_{13}^x}}}{1+e^{-\beta_{A_{13}^x}}}, \qquad (74)$$

where $\mu_{A_{13}}(x)+\mu_{A_{14}}(x)=1, \forall x \in [0,\infty]$.

Output: value is between 0 and 1 indicating a degree of the linguistic label $A_m$.

Node 122-15 operates as follows.

Linguistic label $A_{15}$: Frequency of updating profiles for a certain user is high.

Membership function $O_{15}$:

$$\mu_{A_{15}}(x) = \frac{1-e^{-\beta_{A_{15}^x}}}{1+e^{-\beta_{A_{15}^x}}} \qquad (75)$$

Output: value is between 0 and 1 indicating a degree of the linguistic label $A_{15}$.

Node 122-16 operates as follows.

Linguistic label $A_{16}$: Frequency of updating profiles for a certain user is low.

Membership function $O_{16}$:

$$\mu_{A_{16}}(x) = \frac{2e^{-\beta_{A_{15}^x}}}{1+e^{-\beta_{A_{15}^x}}}, \qquad (76)$$

where $\mu_{A_{15}}(x)+\mu_{A_{16}}(x)=1, \forall x \in [0,\infty]$.

Output: value is between 0 and 1 indicating a degree of the linguistic label $A_{16}$.

Node 122-17 operates as follows.

Linguistic label $A_{17}$: Frequency of updating, adding, or deleting OTP devices for a certain user is high.

Membership function $O_{17}$:

$$\mu_{A_{17}}(x) = \frac{1-e^{-\beta_{A_{17}^x}}}{1+e^{-\beta_{A_{17}^x}}} \qquad (77)$$

Output: value is between 0 and 1 indicating a degree of the linguistic label $A_{17}$.

Node 122-18 operates as follows.

Linguistic label $A_{18}$: Frequency of updating, adding, or deleting OTP devices for a certain user is low.

Membership function $O_{18}$:

$$\mu_{A_{18}}(x) = \frac{2e^{-\beta_{A_{17}^x}}}{1+e^{-\beta_{A_{17}^x}}}, \qquad (78)$$

where $\mu_{A_{17}}(x)+\mu_{A_{18}}(x)=1, \forall x \in [0,\infty]$.

Output: value is between 0 and 1 indicating a degree of the linguistic label $A_{18}$.

Node 122-19 operates as follows.

Linguistic label $A_{19}$: Frequency of a user changing OTP devices is high.

Membership function $O_{19}$:

$$\mu_{A_{19}}(x) = \frac{1-e^{-\beta_{A_{19}^x}}}{1+e^{-\beta_{A_{19}^x}}} \qquad (79)$$

Output: value is between 0 and 1 indicating a degree of the linguistic label $A_{19}$.

Node 122-20 operates as follows.

Linguistic label $A_{20}$: Frequency of a user changing OTP devices is low.

Membership function $O_{20}$:

$$\mu_{A_{20}}(x) = \frac{2e^{-\beta_{A_{19}^x}}}{1+e^{-\beta_{A_{19}^x}}}, \qquad (80)$$

where $\mu_{A_{19}}(x)+\mu_{A_{20}}(x)=1, \forall x \in [0,\infty]$.

Output: value is between 0 and 1 indicating a degree of the linguistic label $A$.

Node 122-21 operates as follows.

Linguistic label $A_{21}$: Frequency of a user typing wrong OTPs is high.

Membership function $O_{21}$:

$$\mu_{A_{21}}(x) = \frac{1-e^{-\beta_{A_{21}^x}}}{1+e^{-\beta_{A_{21}^x}}} \qquad (81)$$

Output: value is between 0 and 1 indicating a degree of the linguistic label $A_{21}$.

Node 122-22 operates as follows.

Linguistic label $A_{22}$: Frequency of a user typing wrong OTPs is low.

Membership function $O_{22}$:

$$\mu_{A_{22}}(x) = \frac{2e^{-\beta_{A_{21}^x}}}{1+e^{-\beta_{A_{21}^x}}}, \qquad (82)$$

where $\mu_{A_{21}}(x)+\mu_{A_{22}}(x)=1, \forall x \in [0,\infty]$.

Output: value is between 0 and 1 indicating a degree of the linguistic label $A_{22}$.

Node 122-23 operates as follows.

Linguistic label $A_{23}$: Given an IP address, frequency of an idle or unsuccessful request is high.

Membership function $O_{23}$:

$$\mu_{A_{23}}(x) = \frac{1-e^{-\beta_{A_{23}^x}}}{1+e^{-\beta_{A_{23}^x}}} \qquad (83)$$

Output: value is between 0 and 1 indicating a degree of the linguistic label $A_{23}$.

Node 122-24 operates as follows.

Linguistic label $A_{24}$: Given a IP address, frequency of an idle or unsuccessful request (see Section 2.10) is low.

Membership function $O_{24}$:

$$\mu_{A_{24}}(x) = \frac{2e^{-\beta_{A_{23}^x}}}{1+e^{-\beta_{A_{23}^x}}}, \tag{84}$$

where $\mu_{A_{23}}(x)+\mu_{A_{24}}(x)=1, \forall x \in [0\infty]$.

Output: value is between 0 and 1 indicating a degree of the linguistic label $A_{24}$.

Figure 3D:
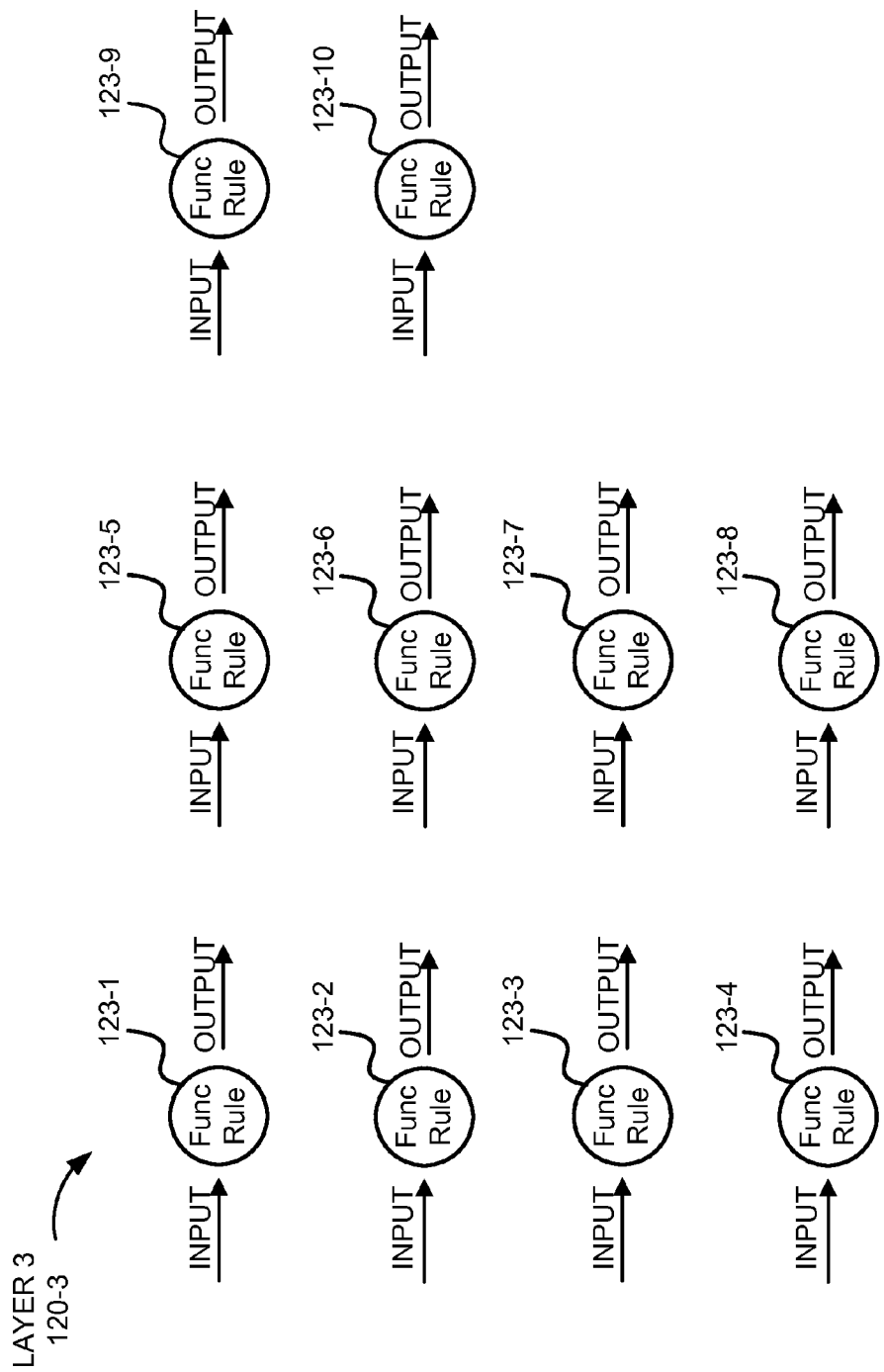
FIG. 3D is a diagram illustrating nodes of a layer 3 of the risk engine.

A description of layer 3 120-3 of risk engine 115 is provided below. According to an exemplary embodiment, layer 3 120-3 includes nodes 123-1 through 123-10 (also referred to collectively as nodes 123). FIG. 3D is a diagram illustrating nodes 123. Each node 123 in layer 3 120-3 is a circle node (i.e., no parameter needs to be trained). Each node 123 applies one of rules $R_1$ through $R_{10}$ and includes a T-norm function. Each node 123 output represents the level of risk pertaining to a rule. As illustrated in the edge description for each node 123, the rule column indicates the rule; the layer 2 column indicates the layer 2 node(s) 122 that provide(s) an input to node 123; the layer 3 column indicates the layer 3 node 123, and the T-norm column indicates the function of node 123. The output of each node 123 corresponds to the output of the T-norm function. For example, referring to node 123-1, the output of node 123-1 is x, $x_2$.

Node 123-1 operates as follows.
Rule $R_1$ T-norm: logical "AND".

$$\mu_{r_1}(x_1,x_2)=x_1 \cdot x_2 \tag{85}$$

Edge description:

| Rule | Layer 2 | Layer 3 | T-norm |
|---|---|---|---|
| $R_1$ | 122-1<br>122-23 | 123-1 | $\mu_{r_1}(x_1, x_2) = x_1 \cdot x_2$ |

Node 123-2 operates as follows.
Rule $R_2$ T-norm: identity function.

$$\mu_{r_2}(x)=x \tag{86}$$

Edge description:

| Rule | Layer 2 | Layer 3 | T-norm |
|---|---|---|---|
| $R_2$ | 122-3 | 123-2 | $\mu_{r_2}(x) = x$ |

Node 123-3 operates as follows.
Rule $R_3$ T-norm: identity function, corresponds to high deviation of geolocation.

$$\mu_{r_3}(x)=x \tag{87}$$

Edge description:

| Rule | Layer 2 | Layer 3 | T-norm |
|---|---|---|---|
| $R_3$ | 122-12 | 123-3 | $\mu_{r_3}(x) = x$ |

Node 123-4 operates as follows.
Rule $R_4$ T-norm: product of the inputs.

$$\mu_{r_4}(x_1,x_2,x_3)=x_1 \times x_2 \times x_3, \tag{88}$$

where $x_1, x_2, x_3$ are outputs of nodes 122-6, 122-8, and 122-10

Edge description:

| Rule | Layer 2 | Layer 3 | T-norm |
|---|---|---|---|
| $R_4$ | 122-6<br>122-8<br>122-10 | 123-4 | $\mu_{r_5}(x_1, x_2, x_3) = x_1 \times x_2 \times x_3$ |

Node 123-5 operates as follows.
Rule $R_5$ T-norm: identity function.

$$\mu_{r_5}(x)=x, \tag{89}$$

where x is output of node 122-13.
Edge description:

| Rule | Layer 2 | Layer 3 | T-norm |
|---|---|---|---|
| $R_5$ | 122-13 | 123-5 | $\mu_{r_6}(x) = x$ |

Node 123-6 operates as follows.
Rule $R_6$ T-norm: identity function.

$$\mu_{r_6}(x)=x \tag{90}$$

where x is output of node 122-15.
Edge description:

| Rule | Layer 2 | Layer 3 | T-norm |
|---|---|---|---|
| $R_6$ | 122-15 | 123-6 | $\mu_{r_6}(x) = x$ |

Node 123-7 operates as follows.
Rule $R_7$ T-norm: identity function.

$$\mu_{r_7}(x)=x, \tag{91}$$

where x is output of node 122-17.
Edge description:

| Rule | Layer 2 | Layer 3 | T-norm |
|---|---|---|---|
| $R_7$ | 122-17 | 123-7 | $\mu_{r_7}(x) = x$ |

Node 123-8 operates as follows.
Rule $R_8$ T-norm: identity function.

$$\mu_{r_8}(x)=x, \tag{92}$$

where x is output of node 122-21.
Edge description:

| Rule | Layer 2 | Layer 3 | T-norm |
|---|---|---|---|
| $R_8$ | 122-21 | 123-8 | $\mu_{r_8}(x) = x$ |

Node 123-9 operates as follows.
Rule $R_9$ T-norm: identity function.

$$\mu_{r_9}(x)=x, \tag{93}$$

where x is output of node 122-19.
Edge description:

| Rule | Layer 2 | Layer 3 | T-norm |
|---|---|---|---|
| $R_9$ | 122-19 | 123-9 | $\mu_{r_9}(x) = x$ |

Node 123-10 operates as follows.

Rule $R_{10}$ T-norm: a logical "AND".

$$\mu_{t_{10}}(x_1, x_2, \ldots, x_7) = \prod_{i=1}^{7} x_i, \tag{94}$$

where $(x_1, x_2, \ldots, x_7)$ are outputs of nodes 122-4, 122-14, 122-16, 122-18, 122-20, 122-22, and 122-24 respectively.

Edge description:

| Rule | Layer 2 | Layer 3 | T-norm |
|---|---|---|---|
| $R_{10}$ | 122-4 | 123-10 | $\mu_{t_{10}}(x_1, x_2, \ldots, x_7) = \Pi_{i=1}^{7} x_i$ |
|  | 122-14 |  |  |
|  | 122-16 |  |  |
|  | 122-18 |  |  |
|  | 122-20 |  |  |
|  | 122-22 |  |  |
|  | 122-24 |  |  |

Figure 3E:
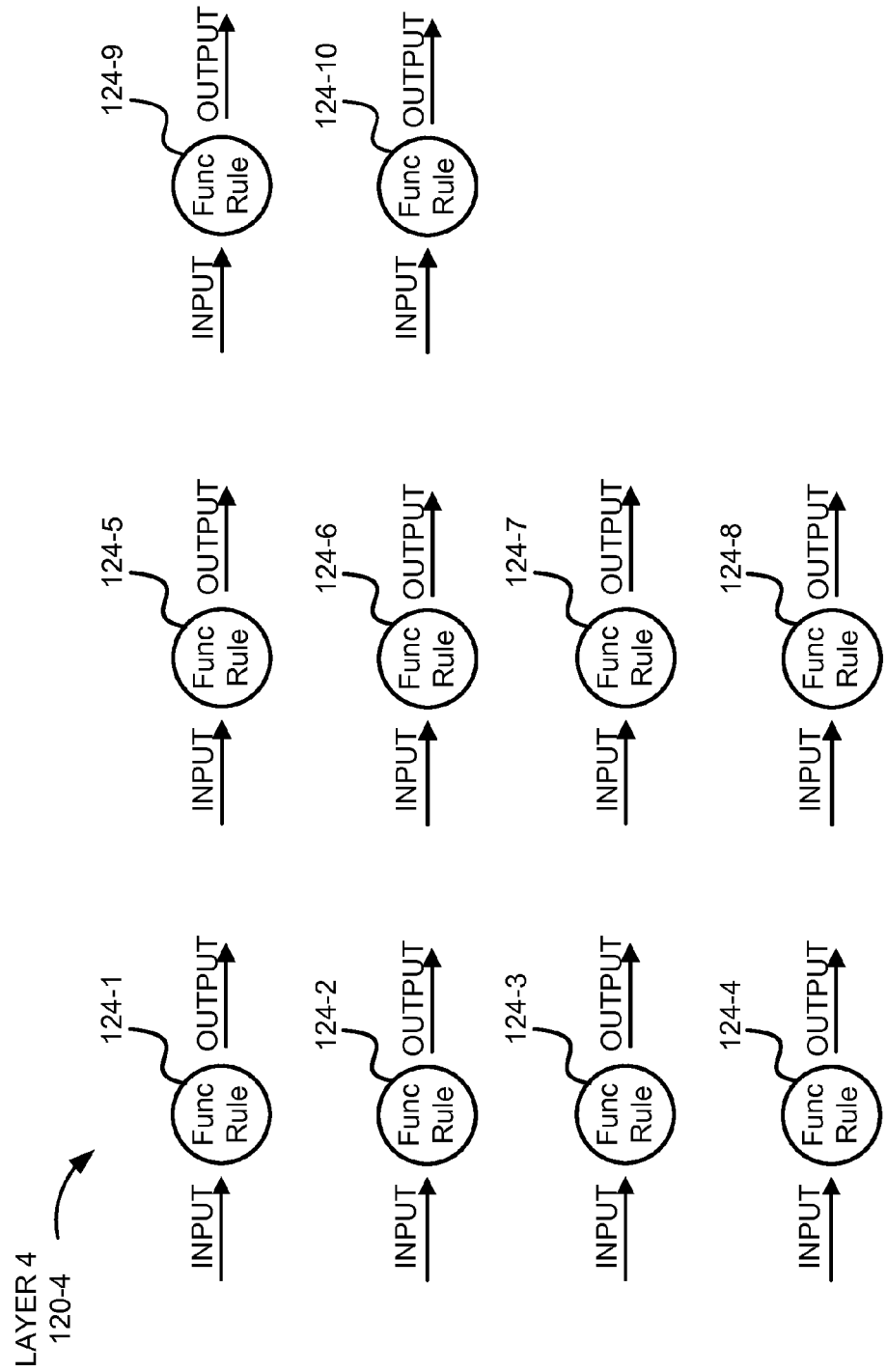
FIG. 3E is a diagram illustrating nodes of a layer 4 of the risk engine.

A description of layer 4 120-4 of risk engine 115 is provided below. According to an exemplary embodiment, layer 4 120-4 includes nodes 124-1 through 124-10 (also referred to collectively as nodes 124). FIG. 3E is a diagram illustrating nodes 124. Each node 124 of layer 4 120-4 is a circle node. The number of nodes 124 of layer 4 120-4 is equal to the number of nodes 123 of layer 3 120-3. Assume that an output from node 123-1 is input to node 124-1, an output from node 123-2 is input to node 124-2, and so on. Also, assume the output from the i th node of layer 3 is $w_i$. Then, the output of the corresponding i th node of layer 4 is defined as follows.

$$\overline{w}_i = \frac{w_i}{\sum w_i}, \tag{95}$$

in which each output from node 123 of layer 3 is normalized by its corresponding node 124 of layer 4. In this regard, each node 124 receives all the output values from all of nodes 123 so as to calculate $\Sigma w_i$.

Figure 3F:
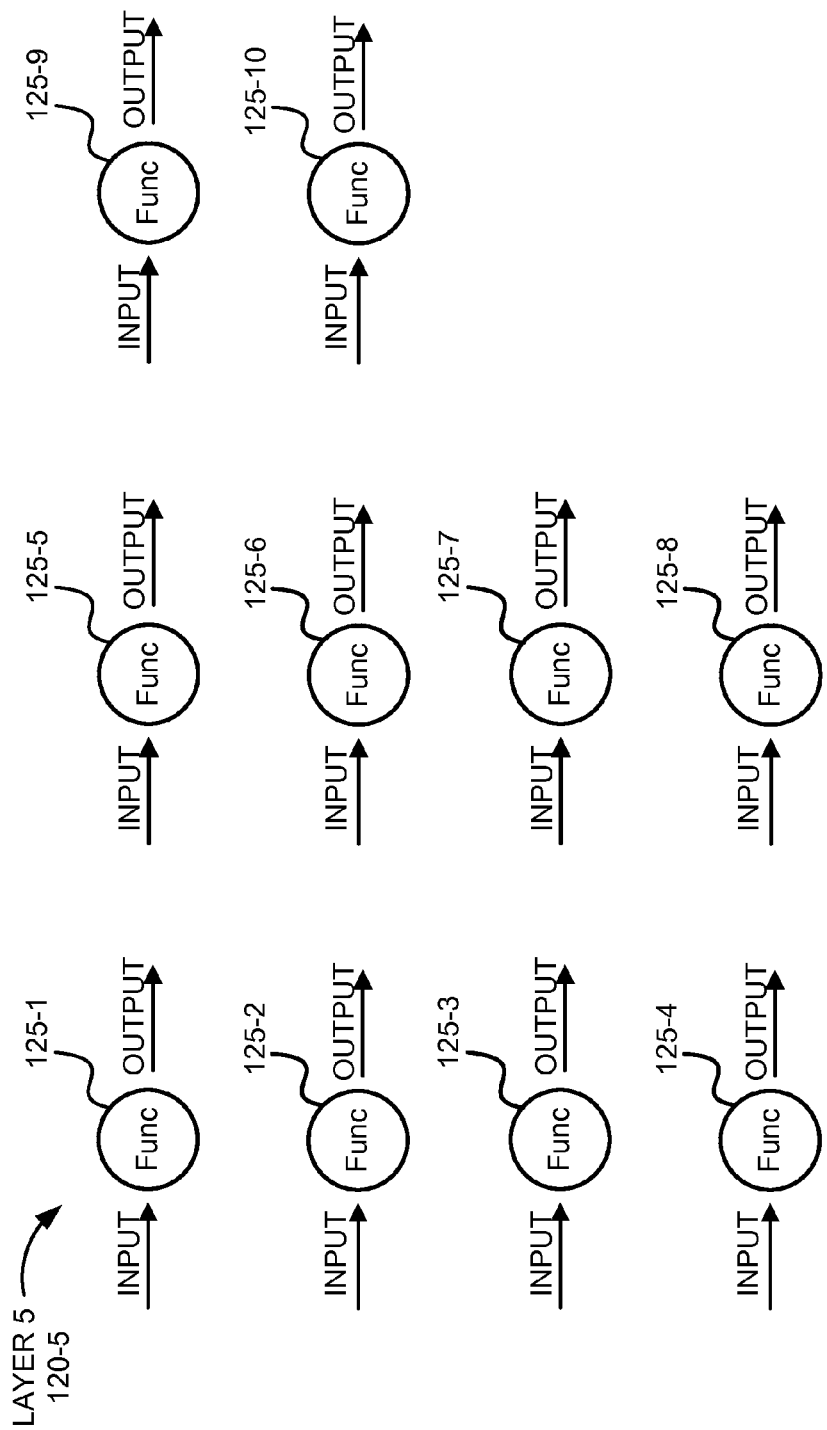
FIG. 3F is a diagram illustrating nodes of a layer 5 of the risk engine.

A description of layer 5 120-5 of risk engine 115 is provided below. According to an exemplary embodiment, layer 5 120-5 includes nodes 125-1 through 125-10 (also referred to collectively as nodes 125). FIG. 3F is a diagram illustrating nodes 125. Each node 125 of layer 5 120-5 is a square node with a node function $$O_i^5 = \overline{w}_i \cdot f_i = \overline{w}_i (\Sigma_j a_{i,j} x_j + c_i), \tag{96}$$

where i is a node index of layer 5; $\overline{w}_i$ is the output of the ith node in layer 4 $x_j$ is the output of the j th node in layer 1; and $(a_{i,j}, c_i)$ represents the parameter set. As defined by layer 1, each node 125 of layer 5 has fourteen parameters to train. For example, the thirteen parameters associated with layer 1 and the one parameter c. This implies that the training data set must have no less than 140 (14*10) entries (i.e., unknowns), in which 10 corresponds to the number of nodes in layer 5.

A description of layer 6 120-6 of risk engine 115 is provided below. According to an exemplary embodiment, layer 6 120-6 includes a single node 126, as previously illustrated in FIG. 2. Node 126 is a circle node that computes the overall output as the summation of all incoming signals according to equation (97).

$$O_1^6 = \text{overalloutput} = \sum_i \overline{w}_i f_i = \frac{\sum_i w_i f_i}{\sum_i w_i} \tag{97}$$

Regarding equation (97), if more than one rule has a high level of risk, the normalized level of risks (of the nodes of layer 4) may be diluted. That is, the outputs of risk may be lower than the expected values due to the normalization. Therefore, the $\Sigma$ as expressed in equation (97) may be modified as follows.

Given a threshold thr, a beta, and upper/lower coefficients upCoef and lowCoef, let c represent the number of $\overline{w}_i f_i$ (inputs of layer 6) that are greater than the threshold thr. The membership function of node 126 is redefined as:

$$O_1^6 = \left(\text{upCoef} \cdot \frac{1 - e^{-beta(c-1)}}{1 + e^{-beta(c-1)}} + \text{lowCoef}\right) \cdot \sum_i \overline{w}_i f_i, \tag{98}$$

where, after tuning and training, the threshold thr=0.05, $\beta$=0.08, upper/lower coefficients upCoef=7 and lowCoef=1.

As previously mentioned in relation to nodes 122, the fourth column of Table 1 indicates the parameter $\beta$. The value for parameter $\beta$ is not initially known and is obtained from training data. A description of exemplary training data and parameter learning is described below.

Assume S denotes a set of parameters for risk engine 115. S can be decomposed into two sets $$S = S_1 \oplus S_2, \tag{99}$$

where $\oplus$ represents direct sum; $S_1$ denotes the set of parameters of a hidden layer; $S_2$ denotes the set of parameters of a hidden layer. In other words, $S_1$ represents all the $\beta$s of layer 2 and $S_2$ represents $(a_{i,j}, c_i)$ of layer 5. Different learning strategies to train these two parameter sets may be used. For example, for $S_1$, a gradient descent method to approach the fitness results may be used. For $S_2$, these elements may be identified by the least squares method.

Referring to the gradient descent method, assume a given training dataset has P entries. An error measure for the p th ($1 \leq p \leq P$) entry of training data may be defined as the sum of squared errors:

$$E_p = \frac{1}{2}(o^p - t^p)^2, \tag{100}$$

where $t^p$ is the p th target output value and $o^p$ is actual output value produced by the presentation of the p th input vector. This implies that $o^p = \Sigma_i \overline{w}_i f_i$ (i.e., the output of layer 6). Given a parameter $\alpha$, the derivative of the overall error measure E with respect to $\alpha$ is $$\frac{\partial E}{\partial \alpha} = \sum_{p=1}^{P} \frac{\partial E_p}{\partial \alpha} = \sum_{p=1}^{P} (o^p - t^p) \frac{\partial \sum_i \overline{w}_i f_i}{\partial \alpha}, \tag{101}$$

where $t^p$ is the p th target output and $o^p$ is the actual output by node 126 of layer 6.

Accordingly, the update formula for the generic parameter $\alpha$ is $$\Delta\alpha = -\eta\frac{\partial E}{\partial \alpha}, \qquad (102)$$

where $\eta > 0$ is a user-defined learning rate. Usually, $\eta \in (0,1)$. An iteration of a learning formula may be expressed as:

$$\alpha(t+1) = \alpha(t) + \Delta\alpha = \alpha(t) - \eta\frac{\partial E}{\partial \alpha}. \qquad (103)$$

$X = (x_1, x_2, \ldots, x_{11})$ denotes the output of layer 1. For $x_i$, the value is fed into nodes 122 of layer 2 with functions $\mu_{A_{(2i-1)}}(x_1)$ pertaining to the odd-numbered nodes 122 and $\mu_{A_{(2i)}}(x_1)$ pertaining to the even-numbered nodes 122. For layer 3, let $\mu_{T_i}$ be the corresponding node function for $x_i$. The output of layer 3 may be expressed as $$w_i = \mu_{T_i} \circ \mu_{A_{(2i-1)}}(x_i) \qquad (104)$$

and $$w_{i''} = \mu_{T_i} \circ \mu_{A_{(2i)}}(x_i) \qquad (105)$$

$\overline{w}_i$ is computed in each node at layer 4. Here, a formula is constructed corresponding to $w_{i'}$ at layer 4.

$$\overline{w}_{i'} = \frac{w_{i'}}{\sum w_j} = \frac{w_{i'}}{w_{i'} + w_{i''} + \sum_{j \ne i} w_j} \qquad (106)$$

At layer 6, the output may be expressed as:

$$\sum_i \overline{w}_i f_i = \frac{\sum_i w_i f_i}{\sum_i w_i}$$

$$= \frac{w_{i'} f_i(A_{i,l}, X) + w_{i''} f_j(A_{j,l}, X) + \sum_{k \ne i,j} w_k f_k}{w_{i'} + w_{i''} + \sum_{k \ne i,j} w_k}$$

Given a parameter $\alpha$ of $w_{i'}$ and $w_{i''}$. When a partial derivative of overalloutput $= \sum_i \overline{w}_i f_i$ with respect to $\alpha$ is taken, this produces:

$$\frac{\partial \sum_i \overline{w}_i f_i}{\partial \alpha} = \sum_i \frac{\partial \overline{w}_i f_i}{\partial \alpha}, \qquad (107)$$

$$= \sum_i \frac{f_i \partial \overline{w}_i}{\partial \alpha}$$

$$= \frac{f_k \partial \overline{w}_{i'}}{\partial \alpha} + \frac{f_j \partial \overline{w}_{i''}}{\partial \alpha} + \sum_{(i \ne k, j)} \frac{f_i \partial \overline{w}_i}{\partial \alpha}$$

$$= f_k \frac{\partial \frac{w_{i'}}{\sum w_i}}{\partial \alpha} + f_j \frac{\partial \frac{w_{i''}}{\sum w_i}}{\partial \alpha} + \sum_{(i \ne k, j)} f_i \frac{\partial \frac{w_i}{\sum w_i}}{\partial \alpha}$$

where $$\frac{\partial \frac{w_{i'}}{\sum w_i}}{\partial \alpha} = \frac{\partial \frac{w_{i'}}{w_{i'} + w_{i''} + \sum_{j \ne i} w_j}}{\partial \alpha} \qquad (108)$$

$$= \frac{w_{i''} \frac{\partial w_{i'}}{\partial \alpha} - w_{i'} \frac{\partial w_{i''}}{\partial \alpha} + \sum w_i}{(\sum w_i)^2}$$

$$\frac{\partial \frac{w_{i''}}{\sum w_i}}{\partial \alpha} = \frac{\partial \frac{w_{i''}}{w_{i'} + w_{i''} + \sum_{j \ne i} w_j}}{\partial \alpha} \qquad (109)$$

$$= \frac{w_{i'} \frac{\partial w_{i''}}{\partial \alpha} - w_{i''} \frac{\partial w_{i'}}{\partial \alpha} + \sum w_i}{(\sum w_i)^2}$$

$$\frac{\partial \frac{w_j}{\sum w_i}}{\partial \alpha} = -w_j \frac{\frac{\partial w_{i'}}{\partial \alpha} + \frac{\partial w_{i''}}{\partial \alpha}}{(\sum w_i)^2} \qquad (110)$$

Regarding the least squares method, given values of elements of $S_1$, P training data may provide input into the function $$\text{output} = F(\vec{I}, S), \qquad (111)$$

where F represents the overall network function; $\vec{I}$ is the set of training data, and S is the set of parameters. Then a matrix equation may be obtained as:

$$AX = B, \qquad (112)$$

where $X = (a_{i,j}, c_i)$. $AX = B$ may not have solution. The reason is that the number of training entries is more than the number of $(a_{i,j}, c_i)$. The size of $|S_2| = 140$, $(14 \times 10)$, as previously described. As described above for equation (96) of layer 5:

$$O_i^5 = \overline{w}_i f_i = \overline{w}_i (\Sigma_j a_{i,j} x_j + c_i), \qquad (96)$$

where i is a node index of layer 5; $\overline{w}_i$ is the output of the ith node in layer 4 $x_j$ is the output of the jth node in layer 1; and $(a_{i,j}, c_i)$ represents the parameter set. Thus, the fourteen unknowns include thirteen of $a_{i,j}$ and one of $c_i$. Additionally, since there are ten nodes in layer 5, there are 140 unknown parameters that need to be trained.

If there are more than $|S_2|$ training data entries, $AX = B$ is an overdetermined problem. In other words, the error $e = \|AX - B\|$ may not always result to zero. To reach the fitness solution, an objective is to minimize the error $e = \|AX - B\|^2$. Such an objective lends itself to a least squares solution, which minimizes the error of $\|AX - B\|^2$. The general solution may be expressed as:

$$X^* = (A^T A)^{-1} A^T B, \qquad (113)$$

where $A^T$ is the transpose of A, and $(A^T A)^{-1} A^T$ is the pseudo-inverse of A if $A^T A$ is non-singular.

According to an exemplary embodiment, the gradient descent method and the least squares method are combined to train the parameters. Each iteration of learning procedure is composed of a forward pass and backward pass. In the forward pass, input data and functional signals are supplied to go forward to calculate each node output until the matrices A and B in equation (112) are obtained. The parameters in $S_2$ are identified by the sequential least squares formula of equation (113). After identifying parameters in $S_2$ the functional signals keep going forward till the error measure is calculated. In the backward pass, the error rates propagate from the output end toward the input end, and the parameters in $S_1$ are updated by the gradient method of equation (103).

Provided below is a further description of the membership function, as defined by equation (96) of layer 5.

As previously described, each node 125 of layer 5 120-5 is a square node with a node function $$O_i^5 = \overline{w}_i f_i = \overline{w}_i (\Sigma_j a_{i,j} x_j + c_i), \qquad (96)$$

where i is a node index of layer 5; $x_j$ is the output of the jth node in layer 1; and $(a_{i,j}, c_i)$ represents the parameter set. Based on equation (96), a coefficient matrix may be defined as $$A_{10,14} = \begin{pmatrix} a_{1,1} & a_{1,2} & \cdots & a_{1,14} \\ a_{2,1} & a_{2,2} & \cdots & a_{2,14} \\ \vdots & \vdots & \ddots & \vdots \\ a_{10,1} & a_{10,2} & \cdots & a_{10,14} \end{pmatrix}, \quad (114)$$

where the i th row defines the coefficients of the membership function for the node 125-$i$. More specifically, function $f$, as expressed in equation (115) provides a definition of the membership function of node 125-$i$.

$$f_i = a_{i,1}x_1 + a_{i,2}x_2 + \ldots + a_{i,13}x_{13} + a_{i,14}, \quad (115)$$

where $x_i$ is the output of nodes 121 of layer 1 and $a_{i,j}$ represents the coefficient of $f_i$. Therefore, the output of the i th node 125 is $$\overline{w}_i \cdot f_i = \overline{w}_i \cdot (a_{i,1}x_1 + a_{i,2}x_2 + \ldots + a_{i,13}x_{13} + a_{i,14}). \quad (116)$$

The membership function of layer 4 is described. The output i th node 124 of layer 4 is defined by equation (95), which is $$\overline{w}_i = \frac{w_i}{\sum w_i}, \quad (117)$$

where $w_i$ is output of the i th node 123 of layer 3. The following list summarizes the definition of $w_i$.

$w_1$:
Node: 123-1
Parameters: $\beta_{A_1}$ in $\mu_{A_1}$, $\beta_{A_{23}}$ in $\mu_{A_{23}}$.

$$w_1 = \mu_{A_1}(x_1) \cdot \mu_{A_{23}}(x_{12}) \quad (118)$$

$w_2$:
Node: 123-2
Parameters: $\beta_{A_3}$ in $\mu_{A_3}$.

$$w_2 = \mu_{A_3}(x_2) \quad (119)$$

$w_3$:
Node: 123-3
Parameters: $\beta_{A_{11}}$ in $\mu_{A_{12}}$.

$$w_3 = \mu_{A_{12}}(x_6, x_{13}) \quad (120)$$

$w_4$:
Node: 123-4
Parameters: $\beta_{A_5}$ in $\mu_{A_6}$, $\beta_{A_7}$ in $\mu_{A_8}$, $\beta_{A_9}$ in $\mu_{A_{10}}$.

$$w_4 = \mu_{A_6}(x_3) \cdot \mu_{A_8}(x_4) \cdot \mu_{A_{10}}(x_5) \quad (121)$$

$w_5$:
Node: 123-5
Parameters: $\beta_{A_{13}}$ in $\mu_{A_{13}}$.

$$w_5 = \mu_{A_{13}}(x_7) \quad (122)$$

$w_6$:
Node: 123-6
Parameters: $\beta_{A_{15}}$ in $\mu_{A_{15}}$.

$$w_6 = \mu_{A_{15}}(x_8) \quad (123)$$

$w_7$:
Node: 123-7
Parameters: $\beta_{A_{17}}$ in $\mu_{A_{17}}$.

$$w_7 = \mu_{A_{17}}(x_9) \quad (124)$$

$w_8$:
Node: 123-8
Parameters: $\beta_{A_{21}}$ in $\mu_{A_{21}}$.

$$w_8 = \mu_{A_{21}}(x_{11}) \quad (125)$$

$w_9$:
Node: 123-9
Parameters: $\beta_{A_{19}}$ in $\mu_{A_{19}}$.

$$w_9 = \mu_{A_{19}}(x_{10}) \quad (126)$$

$w_{10}$:
Node: 123-10
Parameters: $\beta_{A_3}$ in $\mu_{A_4}$, $\beta_{A_{13}}$ in $\mu_{A_{14}}$, $\beta_{A_{15}}$ in $\mu_{A_{16}}$, $\beta_{A_{17}}$ in $\mu_{A_{18}}$, $\beta_{A_{19}}$ in $\mu_{A_{20}}$, $\beta_{A_{21}}$ in $\mu_{A_{22}}$, $\beta_{A_{23}}$ in $\mu_{A_{24}}$.

$$w_{10} = \mu_{A_4}(x_2) \cdot \mu_{A_{14}}(x_7) \cdot \mu_{A_{16}}(x_8) \cdot \mu_{A_{18}}(x_9) \cdot \mu_{A_{20}}(x_{10}) \cdot \mu_{A_{22}}(x_{11}) \cdot \mu_{A_{24}}(x_{12}) \quad (127)$$

Table (2) summarizes layer 3 120-3 membership functions with respect to coefficients.

TABLE 2

| $\beta$ | functions list | membership functions |
|---|---|---|
| $\beta_{A_1}$ | $w_1$ | $w_1 = \mu_{A_1}(x_1) \cdot \mu_{A_{23}}(x_{12})$ |
| $\beta_{A_3}$ | $w_2$ | $w_2 = \mu_{A_3}(x_2)$ |
|  | $w_{10}$ | $w_{10} = \mu_{A_4}(x_2) \cdot \mu_{A_{14}}(x_7) \cdot \mu_{A_{16}}(x_8) \cdot \mu_{A_{18}}(x_9) \cdot \mu_{A_{20}}(x_{10}) \cdot \mu_{A_{22}}(x_{11}) \cdot \mu_{A_{24}}(x_{12})$ |
| $\beta_{A_5}$ | $w_4$ | $w_4 = \mu_{A_6}(x_3) \cdot \mu_{A_8}(x_4) \cdot \mu_{A_{10}}(x_5)$ |
| $\beta_{A_7}$ | $w_4$ | $w_4 = \mu_{A_6}(x_3) \cdot \mu_{A_8}(x_4) \cdot \mu_{A_{10}}(x_5)$ |
| $\beta_{A_9}$ | $w_4$ | $w_4 = \mu_{A_6}(x_3) \cdot \mu_{A_8}(x_4) \cdot \mu_{A_{10}}(x_5)$ |
| $\beta_{A_{11}}$ | $w_3$ | $w_3 = \mu_{A_{12}}(x_6, x_{13})$ |
| $\beta_{A_{13}}$ | $w_5$ | $w_5 = \mu_{A_{13}}(x_7)$ |
|  | $w_{10}$ | $w_{10} = \mu_{A_4}(x_2) \cdot \mu_{A_{14}}(x_7) \cdot \mu_{A_{16}}(x_8) \cdot \mu_{A_{18}}(x_9) \cdot \mu_{A_{20}}(x_{10}) \cdot \mu_{A_{22}}(x_{11}) \cdot \mu_{A_{24}}(x_{12})$ |
| * $\beta_{A_{15}}$ | $w_6$ | $w_6 = \mu_{A_{15}}(x_8)$ |
|  | $w_{10}$ | $w_{10} = \mu_{A_4}(x_2) \cdot \mu_{A_{14}}(x_7) \cdot \mu_{A_{16}}(x_8) \cdot \mu_{A_{18}}(x_9) \cdot \mu_{A_{20}}(x_{10}) \cdot \mu_{A_{22}}(x_{11}) \cdot \mu_{A_{24}}(x_{12})$ |
| * $\beta_{A_{17}}$ | $w_7$ | $w_7 = \mu_{A_{17}}(x_9)$ |
|  | $w_{10}$ | $w_{10} = \mu_{A_4}(x_2) \cdot \mu_{A_{14}}(x_7) \cdot \mu_{A_{16}}(x_8) \cdot \mu_{A_{18}}(x_9) \cdot \mu_{A_{20}}(x_{10}) \cdot \mu_{A_{22}}(x_{11}) \cdot \mu_{A_{24}}(x_{12})$ |
| * $\beta_{A_{19}}$ | $w_9$ | $w_9 = \mu_{A_{19}}(x_{10})$ |
|  | $w_{10}$ | $w_{10} = \mu_{A_4}(x_2) \cdot \mu_{A_{14}}(x_7) \cdot \mu_{A_{16}}(x_8) \cdot \mu_{A_{18}}(x_9) \cdot \mu_{A_{20}}(x_{10}) \cdot \mu_{A_{22}}(x_{11}) \cdot \mu_{A_{24}}(x_{12})$ |
| * $\beta_{A_{21}}$ | $w_8$ | $w_8 = \mu_{A_{21}}(x_{11})$ |
|  | $w_{10}$ | $w_{10} = \mu_{A_4}(x_2) \cdot \mu_{A_{14}}(x_7) \cdot \mu_{A_{16}}(x_8) \cdot \mu_{A_{18}}(x_9) \cdot \mu_{A_{20}}(x_{10}) \cdot \mu_{A_{22}}(x_{11}) \cdot \mu_{A_{24}}(x_{12})$ |
| * $\beta_{A_{23}}$ | $w_{10}$ | $w_{10} = \mu_{A_4}(x_2) \cdot \mu_{A_{14}}(x_7) \cdot \mu_{A_{16}}(x_8) \cdot \mu_{A_{18}}(x_9) \cdot \mu_{A_{20}}(x_{10}) \cdot \mu_{A_{22}}(x_{11}) \cdot \mu_{A_{24}}(x_{12})$ |

As previously mentioned, Table 2 summarizes the definition of the membership function $w_i$. Provided below is a further description of gradient descent with respect to coefficients $\beta$s, which are the parameters of layer 2 120-2. As illustrated in Table 1, there are twelve $\beta$s. Values for these $\beta$s need to be trained where, according to an exemplary embodiment, the training stems from the use of a gradient descent learning method. As illustrated below, we use $$\frac{\partial \sum_i \overline{w}_i f_i}{\partial \beta}$$

to derive $\beta$. To simplify our discussion, the notation of $\beta_{A_i}$ is replaced with $\beta_i$.

Derivative with respect to $\beta_{A_1}$:

$$\frac{\partial \sum_i \overline{w}_i f_i}{\partial \beta_1} = \sum_i f_i \cdot \frac{\partial \overline{w}_i}{\partial \beta_1} \qquad (128)$$

$$= f_1 \cdot \frac{\partial \overline{w}_1}{\partial \beta_1} + \sum_{i \neq 1} f_i \cdot \frac{\partial \overline{w}_i}{\partial \beta_1}$$

$$= f_1 \cdot \frac{\partial \frac{w_1}{\sum_i w_i}}{\partial \beta_1} + \sum_{j \neq 1} f_j \cdot \frac{\partial \frac{w_j}{\sum_i w_i}}{\partial \beta_1}$$

where $$\sum_i w_i = w_1 + \sum_{i \neq 1} w_i.$$

$$\frac{\partial \frac{w_1}{\sum_i w_i}}{\partial \beta_1} = \frac{w_{1'} \cdot \sum_i w_i - \left(\sum_i w_i\right)' \cdot w_1}{\left(\sum_i w_i\right)^2} \qquad (129)$$

$$= \frac{w_{1'} \cdot \sum_i w_i - w_{1'} \cdot w_1}{\left(\sum_i w_i\right)^2}$$

$$= \frac{w_{1'} \cdot \left(\sum_i w_i - w_1\right)}{\left(\sum_i w_i\right)^2}$$

$$\sum_{j \neq 1} f_j \cdot \frac{\partial \frac{w_j}{\sum_i w_i}}{\partial \beta_1} = \sum_{j \neq 1} f_j \cdot w_j \left(\frac{1}{\sum_i w_i}\right)' \qquad (130)$$

$$= \left(\frac{1}{\sum_i w_i}\right)' \cdot \sum_{j \neq 1} f_j \cdot w_j$$

$$= \left(-\frac{\left(\sum_i w_i\right)'}{\left(\sum_i w_i\right)^2}\right) \cdot \sum_{j \neq 1} f_j \cdot w_j$$

$$= \left(-\frac{\left(w_1 + \sum_{i \neq 1} w_i\right)'}{\left(\sum_i w_i\right)^2}\right) \cdot \sum_{j \neq 1} f_j \cdot w_j$$

$$= -\frac{(w_1)'}{\left(\sum_i w_i\right)^2} \cdot \sum_{j \neq 1} f_j \cdot w_j$$

where $$(w_1)' = (\mu_{A_1}(x_1) \mu_{A_{23}}(x_{12}))' \qquad (131)$$

$$= \mu_{A_{23}}(x_{12}) \frac{\partial \mu_{A_1}(x_1)}{\partial \beta_1}$$

Derivative with respect to $\beta_{A_3}$:

$$\frac{\partial \sum_i \overline{w}_i f_i}{\partial \beta_3} = \sum_i f_i \cdot \frac{\partial \overline{w}_i}{\partial \beta_3} \qquad (132)$$

$$= f_2 \cdot \frac{\partial \overline{w}_2}{\partial \beta_3} + f_{10} \cdot \frac{\partial \overline{w}_{10}}{\partial \beta_3} + \sum_{i \neq 2,10} f_i \cdot \frac{\partial \overline{w}_i}{\partial \beta_3}$$

$$= f_2 \cdot \frac{\partial \frac{w_2}{\sum_i w_i}}{\partial \beta_3} + f_{10} \cdot \frac{\partial \frac{w_{10}}{\sum_i w_i}}{\partial \beta_3} + \sum_{j \neq 2,10} f_j \cdot \frac{\partial \frac{w_j}{\sum_i w_i}}{\partial \beta_3}$$

$$\frac{\partial \frac{w_2}{\sum_i w_i}}{\partial \beta_3} = \frac{w_{2'} \cdot \sum_i w_i - \left(\sum_i w_i\right)' \cdot w_2}{\left(\sum_i w_i\right)^2} \qquad (133)$$

$$= \frac{w_{2'} \cdot \sum_i w_i - (w_{2'} + w_{10}') \cdot w_2}{\left(\sum_i w_i\right)^2}$$

$$\frac{\partial \frac{w_{10}}{\sum_i w_i}}{\partial \beta_3} = \frac{w_{10}' \cdot \sum_i w_i - \left(\sum_i w_i\right)' \cdot w_{10}}{\left(\sum_i w_i\right)^2} \qquad (134)$$

$$= \frac{w_{10}' \cdot \sum_i w_i - (w_{2'} + w_{10}') \cdot w_{10}}{\left(\sum_i w_i\right)^2}$$

$$\sum_{j \neq 2,10} f_j \cdot \frac{\partial \frac{w_j}{\sum_i w_i}}{\partial \beta_3} = \sum_{j \neq 2,10} f_j \cdot w_j \cdot \left(\frac{1}{\sum_i w_i}\right)' \qquad (135)$$

$$= -\frac{\left(\sum_i w_i\right)'}{\left(\sum_i w_i\right)^2} \cdot \sum_{j \neq 2,10} f_j \cdot w_j$$

$$= -\frac{w_{2'} + w_{10}'}{\left(\sum_i w_i\right)^2} \cdot \sum_{j \neq 2,10} f_j \cdot w_j$$

where $$w_{2'} = \frac{\partial \mu_{A_3}(x_2)}{\partial \beta_3} \qquad (136)$$

and $$w_{10}' = \frac{\partial w_{10}}{\partial \beta_3} \qquad (137)$$

$$= \frac{\partial \mu_{A_4}(x_2) \cdot \mu_{A_{14}}(x_7) \cdot \mu_{A_{16}}(x_8) \cdot \mu_{A_{18}}(x_9) \cdot \mu_{A_{20}}(x_{10}) \cdot \mu_{A_{22}}(x_{11}) \cdot \mu_{A_{24}}(x_{12})}{\partial \beta_3}$$

$$= \mu_{A_{14}}(x_7) \cdot \mu_{A_{16}}(x_8) \cdot \mu_{A_{18}}(x_9) \cdot \mu_{A_{20}}(x_{10}) \cdot \mu_{A_{22}}(x_{11}) \cdot \mu_{A_{24}}(x_{12}) \cdot \frac{\partial \mu_{A_4}(x_2)}{\partial \beta_3}$$

Derivative with respect to $\beta_{a_5}$:

$$\frac{\partial \sum_i \overline{w}_i f_i}{\partial \beta_5} = \sum_i f_i \cdot \frac{\partial \overline{w}_i}{\partial \beta_5} \qquad (138)$$
$$= f_4 \cdot \frac{\partial \overline{w}_4}{\partial \beta_5} + \sum_{i \neq 4} f_i \cdot \frac{\partial \overline{w}_i}{\partial \beta_5}$$
$$= f_4 \cdot \frac{\partial \frac{w_4}{\sum_i w_i}}{\partial \beta_5} + \sum_{j \neq 4} f_j \cdot \frac{\partial \frac{w_j}{\sum_i w_i}}{\partial \beta_5}$$

$$\frac{\partial \frac{w_4}{\sum_i w_i}}{\partial \beta_5} = \frac{w_{4'} \cdot \sum_i w_i - \left(\sum_i w_i\right)' \cdot w_4}{\left(\sum_i w_i\right)^2} \qquad (139)$$
$$= \frac{w_{4'} \cdot \sum_i w_i - w_{4'} \cdot w_4}{\left(\sum_i w_i\right)^2}$$

$$\sum_{j \neq 4} f_j \cdot \frac{\partial \frac{w_j}{\sum_i w_i}}{\partial \beta_5} = \sum_{j \neq 4} f_j \cdot w_j \cdot \left(\frac{1}{\sum_i w_i}\right)' \qquad (140)$$
$$= -\frac{\left(\sum_i w_i\right)'}{\left(\sum_i w_i\right)^2} \cdot \sum_{j \neq 4} f_j \cdot w_j$$
$$= -\frac{w_{4'}}{\left(\sum_i w_i\right)^2} \cdot \sum_{j \neq 4} f_j \cdot w_j$$

where $$w_{4'} = \frac{\partial w_4}{\partial \beta_5} \qquad (141)$$
$$= \frac{\partial \mu_{A_6}(x_3) \cdot \mu_{A_8}(x_4) \cdot \mu_{A_{10}}(x_5)}{\partial \beta_5}$$
$$= \mu_{A_8}(x_4) \cdot \mu_{A_{10}}(x_5) \cdot \frac{\partial \mu_{A_6}(x_3)}{\partial \beta_5}$$

Derivative with respect to $\beta_{A_7}$:

$$\frac{\partial \sum_i \overline{w}_i f_i}{\partial \beta_7} = f_4 \cdot \frac{\partial \frac{w_4}{\sum_i w_i}}{\partial \beta_7} + \sum_{j \neq 4} f_j \cdot \frac{\partial \frac{w_j}{\sum_i w_i}}{\partial \beta_7} \qquad (142)$$

$$\frac{\partial \frac{w_3}{\sum_i w_i}}{\partial \beta_7} = \frac{w_{4'} \cdot \sum_i w_i - w_{4'} \cdot w_4}{\left(\sum_i w_i\right)^2} \qquad (143)$$

$$\sum_{j \neq 4} f_j \cdot \frac{\partial \frac{w_j}{\sum_i w_i}}{\partial \beta_7} = -\frac{w_{4'}}{\left(\sum_i w_i\right)^2} \cdot \sum_{j \neq 4} f_j \cdot w_j \qquad (144)$$

where $$w_{4'} = \frac{\partial w_4}{\partial \beta_7} \qquad (145)$$
$$= \mu_{A_6}(x_3) \cdot \mu_{A_{10}}(x_5) \cdot \frac{\partial \mu_{A_8}(x_4)}{\partial \beta_7}$$

Derivative with respect to $\beta_{A_9}$:

$$\frac{\partial \sum_i \overline{w}_i f_i}{\partial \beta_9} = f_4 \cdot \frac{\partial \frac{w_4}{\sum_i w_i}}{\partial \beta_9} + \sum_{j \neq 4} f_j \cdot \frac{\partial \frac{w_j}{\sum_i w_i}}{\partial \beta_9} \qquad (146)$$

$$\frac{\partial \frac{w_4}{\sum_i w_i}}{\partial \beta_9} = \frac{w_{4'} \cdot \left(\sum_i w_i - w_4\right)}{\left(\sum_i w_i\right)^2} \qquad (147)$$

$$\sum_{j \neq 4} f_j \cdot \frac{\partial \frac{w_j}{\sum_i w_i}}{\partial \beta_9} = -\frac{(w_4)'}{\left(\sum_i w_i\right)^2} \cdot \sum_{j \neq 4} f_j \cdot w_j \qquad (148)$$

where $$w_{4'} = \frac{\partial w_4}{\partial \beta_9} \qquad (149)$$
$$= \mu_{A_6}(x_3) \cdot \mu_{A_8}(x_4) \cdot \frac{\partial \mu_{A_{10}}(x_5)}{\partial \beta_9}$$

Derivative with respect to $\beta_{A_{11}}$:

$$\frac{\partial \sum_i \overline{w}_i f_i}{\partial \beta_{11}} = f_3 \cdot \frac{\partial \frac{w_3}{\sum_i w_i}}{\partial \beta_{11}} + \sum_{j \neq 3} f_i \cdot \frac{\partial \frac{w_j}{\sum_i w_i}}{\partial \beta_{11}} \qquad (150)$$

$$\frac{\partial \frac{w_3}{\sum_i w_i}}{\partial \beta_{11}} = \frac{w_{3'} \cdot \sum_i w_i - w_{3'} \cdot w_3}{\left(\sum_i w_i\right)^2} \qquad (151)$$

$$\sum_{j \neq 3} f_i \cdot \frac{\partial \frac{w_j}{\sum_i w_i}}{\partial \beta_{11}} = -\frac{w_{3'}}{\left(\sum_i w_i\right)^2} \cdot \sum_{j \neq 3} f_j \cdot w_j \qquad (152)$$

where $$w_{3'} = \frac{\partial w_3}{\partial \beta_{11}} \qquad (153)$$
$$= \frac{\partial \mu_{A_{12}}(x_6, x_{13})}{\partial \beta_{11}}$$

Derivative with respect to $\beta_{A_{13}}$:

$$\frac{\partial \sum_i \overline{w}_i f_i}{\partial \beta_{13}} = f_5 \cdot \frac{\partial \frac{w_5}{\sum_i w_i}}{\partial \beta_{13}} + f_{10} \cdot \frac{\partial \frac{w_{10}}{\sum_i w_i}}{\partial \beta_{13}} + \sum_{j \neq 5, 10} f_j \cdot \frac{\partial \frac{w_j}{\sum_i w_i}}{\partial \beta_{13}} \qquad (154)$$

$$\frac{\partial \frac{w_5}{\sum_i w_i}}{\partial \beta_{13}} = \frac{w_{5'} \cdot \sum_i w_i - (w_{5'} + w'_{10}) \cdot w_5}{\left(\sum_i w_i\right)^2} \qquad (155)$$

$$\frac{\partial \frac{w_{10}}{\sum_i w_i}}{\partial \beta_{13}} = \frac{w'_{10} \cdot \sum_i w_i - (w_{5'} + w'_{10}) \cdot w_{10}}{\left(\sum_i w_i\right)^2} \qquad (156)$$

$$\sum_{j\neq 5,10} f_j \cdot \frac{\partial \frac{w_j}{\sum_i w_i}}{\partial \beta_{13}} = -\frac{w_{5'} + w'_{10}}{\left(\sum_i w_i\right)^2} \cdot \sum_{j\neq 5,10} f_j \cdot w_j \quad (157)$$

where $$w_{5'} = \frac{\partial w_5}{\partial \beta_{13}} \quad (158)$$
$$= \frac{\partial \mu_{A_{13}}(x_7)}{\partial \beta_{13}}$$

and $$w'_{10} = \frac{\partial w_{10}}{\partial \beta_{13}} \quad (159)$$
$$= \mu_{A_4}(x_2) \cdot \mu_{A_{16}}(x_8) \cdot \mu_{A_{18}}(x_9) \cdot \mu_{A_{20}}(x_{10}) \cdot$$
$$\mu_{A_{22}}(x_{11}) \cdot \mu_{A_{24}}(x_{12}) \cdot \frac{\partial \mu_{A_{14}}(x_7)}{\partial \beta_{13}}$$

Derivative with respect to $\beta_{A_{15}}$:

$$\frac{\partial \sum_i \overline{w}_i f_i}{\partial \beta_{15}} = f_6 \cdot \frac{\partial \frac{w_6}{\sum_i w_i}}{\partial \beta_{15}} + f_{10} \cdot \frac{\partial \frac{w_{10}}{\sum_i w_i}}{\partial \beta_{15}} + \sum_{j\neq 6,10} f_j \cdot \frac{\partial \frac{w_j}{\sum_i w_i}}{\partial \beta_{15}} \quad (160)$$

$$\frac{\partial \frac{w_6}{\sum_i w_i}}{\partial \beta_{15}} = \frac{w_{6'} \cdot \sum_i w_i - (w_{6'} + w'_{10}) \cdot w_6}{\left(\sum_i w_i\right)^2} \quad (161)$$

$$\frac{\partial \frac{w_{10}}{\sum_i w_i}}{\partial \beta_{15}} = \frac{w'_{10} \cdot \sum_i w_i - (w_{6'} + w'_{10}) \cdot w_{10}}{\left(\sum_i w_i\right)^2} \quad (162)$$

$$\sum_{j\neq 6,10} f_j \cdot \frac{\partial \frac{w_j}{\sum_i w_i}}{\partial \beta_{15}} = -\frac{w_{6'} + w'_{10}}{\left(\sum_i w_i\right)^2} \cdot \sum_{j\neq 6,10} f_j \cdot w_j \quad (163)$$

where $$w_{6'} = \frac{\partial w_6}{\partial \beta_{15}} \quad (164)$$
$$= \frac{\partial \mu_{A_{15}}(x_8)}{\partial \beta_{15}}$$

and $$w'_{10} = \frac{\partial w_{10}}{\partial \beta_{15}} \quad (165)$$
$$= \mu_{A_4}(x_2) \cdot \mu_{A_{14}}(x_7) \cdot \mu_{A_{18}}(x_9) \cdot \mu_{A_{20}}(x_{10}) \cdot$$
$$\mu_{A_{22}}(x_{11}) \cdot \mu_{A_{24}}(x_{12}) \cdot \frac{\partial \mu_{A_{16}}(x_8)}{\partial \beta_{15}}$$

Derivative with respect to $\beta_{A_{17}}$:

$$\frac{\partial \sum_i \overline{w}_i f_i}{\partial \beta_{17}} = f_7 \cdot \frac{\partial \frac{w_7}{\sum_i w_i}}{\partial \beta_{17}} + f_{10} \cdot \frac{\partial \frac{w_{10}}{\sum_i w_i}}{\partial \beta_{17}} + \sum_{j\neq 7,10} f_j \cdot \frac{\partial \frac{w_j}{\sum_i w_i}}{\partial \beta_{17}} \quad (166)$$

$$\frac{\partial \frac{w_7}{\sum_i w_i}}{\partial \beta_{17}} = \frac{w_{7'} \cdot \sum_i w_i - (w_{7'} + w'_{10}) \cdot w_7}{\left(\sum_i w_i\right)^2} \quad (167)$$

$$\frac{\partial \frac{w_{10}}{\sum_i w_i}}{\partial \beta_{17}} = \frac{w'_{10} \cdot \sum_i w_i - (w_{7'} + w'_{10}) \cdot w_{10}}{\left(\sum_i w_i\right)^2} \quad (168)$$

$$\sum_{j\neq 7,10} f_j \cdot \frac{\partial \frac{w_j}{\sum_i w_i}}{\partial \beta_{17}} = -\frac{w_{7'} + w'_{10}}{\left(\sum_i w_i\right)^2} \cdot \sum_{j\neq 7,10} f_j \cdot w_j \quad (169)$$

where $$w_{7'} = \frac{\partial w_7}{\partial \beta_{17}} \quad (170)$$
$$= \frac{\partial \mu_{A_{17}}(x_9)}{\partial \beta_{17}}$$

and $$w'_{10} = \frac{\partial w_{11}}{\partial \beta_{17}} \quad (171)$$
$$= \mu_{A_4}(x_2) \cdot \mu_{A_{14}}(x_7) \cdot \mu_{A_{16}}(x_8) \cdot \mu_{A_{20}}(x_{10}) \cdot$$
$$\mu_{A_{22}}(x_{11}) \cdot \mu_{A_{24}}(x_{12}) \cdot \frac{\partial \mu_{A_{18}}(x_9)}{\partial \beta_{17}}$$

Derivative with respect to $\beta_{A_{19}}$:

$$\frac{\partial \sum_i \overline{w}_i f_i}{\partial \beta_{19}} = f_9 \cdot \frac{\partial \frac{w_9}{\sum_i w_i}}{\partial \beta_{19}} + f_{10} \cdot \frac{\partial \frac{w_{10}}{\sum_i w_i}}{\partial \beta_{19}} + \sum_{j\neq 9,10} f_j \cdot \frac{\partial \frac{w_j}{\sum_i w_i}}{\partial \beta_{19}} \quad (172)$$

$$\frac{\partial \frac{w_9}{\sum_i w_i}}{\partial \beta_{19}} = \frac{w'_9 \cdot \sum_i w_i - (w'_9 + w'_{10}) \cdot w_9}{\left(\sum_i w_i\right)^2} \quad (173)$$

$$\frac{\partial \frac{w_{10}}{\sum_i w_i}}{\partial \beta_{19}} = \frac{w'_{10} \cdot \sum_i w_i - (w'_9 + w'_{10}) \cdot w_{10}}{\left(\sum_i w_i\right)^2} \quad (174)$$

$$\sum_{j\neq 9,10} f_j \cdot \frac{\partial \frac{w_j}{\sum_i w_i}}{\partial \beta_{19}} = -\frac{w'_9 + w'_{10}}{\left(\sum_i w_i\right)^2} \cdot \sum_{j\neq 9,10} f_j \cdot w_j \quad (175)$$

where $$w'_9 = \frac{\partial w_9}{\partial \beta_{19}} \quad (176)$$
$$= \frac{\partial \mu_{A_{19}}(x_{10})}{\partial \beta_{19}}$$

and $$w'_{10} = \frac{\partial w_{10}}{\partial \beta_{19}} \quad (177)$$
$$= \mu_{A_4}(x_2) \cdot \mu_{A_{14}}(x_7) \cdot \mu_{A_{16}}(x_8) \cdot \mu_{A_{18}}(x_9) \cdot$$
$$\mu_{A_{22}}(x_{11}) \cdot \mu_{A_{24}}(x_{12}) \cdot \frac{\partial \mu_{A_{20}}(x_{10})}{\partial \beta_{19}}$$

Derivative with respect to $\beta_{A_{21}}$:

$$\frac{\partial \sum_i \overline{w}_i f_i}{\partial \beta_{21}} = f_8 \cdot \frac{\partial \frac{w_8}{\sum_i w_i}}{\partial \beta_{21}} + f_{10} \cdot \frac{\partial \frac{w_{10}}{\sum_i w_i}}{\partial \beta_{21}} + \sum_{j \neq 8,10} f_j \cdot \frac{\partial \frac{w_j}{\sum_i w_i}}{\partial \beta_{21}} \quad (178)$$

$$\frac{\partial \frac{w_8}{\sum_i w_i}}{\partial \beta_{21}} = \frac{w'_8 \cdot \sum_i w_i - (w'_8 + w'_{10}) \cdot w_8}{\left(\sum_i w_i\right)^2} \quad (179)$$

$$\frac{\partial \frac{w_{10}}{\sum_i w_i}}{\partial \beta_{21}} = \frac{w'_{10} \cdot \sum_i w_i - (w'_8 + w'_{10}) \cdot w_{10}}{\left(\sum_i w_i\right)^2} \quad (180)$$

$$\sum_{j \neq 8,10} f_j \cdot \frac{\partial \frac{w_j}{\sum_i w_i}}{\partial \beta_{21}} = -\frac{w'_8 + w'_{10}}{\left(\sum_i w_i\right)^2} \cdot \sum_{j \neq 8,10} f_j \cdot w_j \quad (181)$$

where $$w'_8 = \frac{\partial w_8}{\partial \beta_{21}} \quad (182)$$
$$= \frac{\partial \mu_{A_{21}}(x_{11})}{\partial \beta_{21}}$$

and $$w'_{10} = \frac{\partial w_{10}}{\partial \beta_{21}} \quad (183)$$
$$= \mu_{A_4}(x_2) \cdot \mu_{A_{14}}(x_7) \cdot \mu_{A_{16}}(x_8) \cdot \mu_{A_{18}}(x_9) \cdot$$
$$\mu_{A_{20}}(x_{10}) \cdot \mu_{A_{24}}(x_{12}) \cdot \frac{\partial \mu_{A_{22}}(x_{11})}{\partial \beta_{21}}$$

Derivative with respect to $\beta_{A_{23}}$:

$$\frac{\partial \sum_i \overline{w}_i f_i}{\partial \beta_{23}} = f_{10} \cdot \frac{\partial \frac{w_{10}}{\sum_i w_i}}{\partial \beta_{23}} + \sum_{j \neq 10} f_j \cdot \frac{\partial \frac{w_j}{\sum_i w_i}}{\partial \beta_{23}} \quad (184)$$

$$\frac{\partial \frac{w_{10}}{\sum_i w_i}}{\partial \beta_{23}} = \frac{w'_{10} \cdot \left(\sum_i w_i - w_{10}\right)}{\left(\sum_i w_i\right)^2} \quad (185)$$

$$\sum_{j \neq 10} f_j \cdot \frac{\partial \frac{w_j}{\sum_i w_i}}{\partial \beta_{23}} = -\frac{w'_{10}}{\left(\sum_i w_i\right)^2} \cdot \sum_{j \neq 10} f_j \cdot w_j \quad (186)$$

where $$w'_{10} = \frac{\partial w_{10}}{\partial \beta_{23}} \quad (187)$$
$$= \mu_{A_4}(x_2) \cdot \mu_{A_{14}}(x_7) \cdot \mu_{A_{16}}(x_8) \cdot \mu_{A_{18}}(x_9) \cdot$$
$$\mu_{A_{20}}(x_{10}) \cdot \mu_{A_{22}}(x_{11}) \cdot \frac{\partial \mu_{A_{24}}(x_{12})}{\partial \beta_{23}}$$

The previous equations each include a derivative of $\mu$ with respect to $$\beta \left(\text{i.e. } \frac{\partial \mu}{\partial \beta}\right),$$

where $\mu$ represents a group of functions defined in layer 2. This group of functions is referred to as the "linguistic membership function". All of these functions have the same format (except $\mu_{A_{11}}$ and $\mu_{A_{12}}$) as follows.

$$\mu_1(x) = \frac{1 - e^{-\beta x}}{1 + e^{-\beta x}} \quad (188)$$

$$\mu_2(x) = \frac{2e^{-\beta x}}{1 + e^{-\beta x}} \quad (189)$$

For example, the linguistic membership functions may be set as follows: $x \in [0,3]$ and $\beta = 2$.

Equations (190) and (191) give the derivative of $\mu_1(x)$ and $\mu_2(x)$ with respect to $\beta$, where $$\frac{\partial \mu_1}{\partial \beta} + \frac{\partial \mu_2}{\partial \beta} = 0 \, \forall \, x.$$

$$\frac{\partial \mu_1(x)}{\partial \beta} = \frac{2xe^{-\beta x}}{(1 + e^{-\beta x})^2} \quad (190)$$

$$\frac{\partial \mu_2(x)}{\partial \beta} = -\frac{2xe^{-\beta x}}{(1 + e^{-\beta x})^2} \quad (191)$$

Equations (192) and (193) give the derivative of $\mu_{11}(x)$ and $\mu_{12}(x)$ with respect to $\beta$.

$$\frac{\partial \mu_{11}(x_1, x_2)}{\partial \beta} = x_2 \frac{2xe^{-\beta x_1}}{(1 + e^{-\beta x_1})^2} \quad (192)$$

$$\frac{\partial \mu_{12}(x_1, x_2)}{\partial \beta} = -x_2 \frac{2xe^{-\beta x_1}}{(1 + e^{-\beta x_1})^2} \quad (193)$$

A further description pertaining to the methodologies to train $S_1$ and $S_2$ are described below. As previously described, S denotes the parameters that need to be learned during a training process. S may be decomposed into two sets, $S = S_1 \oplus S_2$. $S_1$ denotes the set of parameters of a hidden layer and $S_2$ denotes the set of parameters of an output layer. More specifically, $S_1$ denotes the parameter set of $\beta$, which is the parameter set of layer 2. $S_2$ denotes the parameter set of $a_{i,j}$, which is explained in relation to equation (115) above. That is, $a_{i,j}$ represents the coefficient of $f_i$.

According to an exemplary embodiment, different strategies are used to train $S_1$ and $S_2$. For example, a gradient descent method may be used to learn parameters of $S_1$ and a least squares method may be used to learn parameters of $S_2$. According to an exemplary embodiment, the gradient method and the least squares method are combined to estimate and learn the parameters in risk engine 115. Each epoch (e.g., iteration) of this hybrid learning procedure is composed of a forward pass and a backward pass. In the forward pass, feeding in input data to calculate each node output until the matrices A and B in AX=B of equation (112) are obtained. Then parameters in $S_2$ are identified by the least squares formula defined by $X^* = (A^T A)^{-1} A^T B$ of equation (113). After identifying parameters in $S_2$, the function signals keep going forward from layer 1 to layer 6 until the error measure is calculated. In the backward pass, the error rates propagate from the output end (layer 6) toward the input end (layer 1), and the parameters in $S_1$ are updated by the gradient method.

Figure 4:
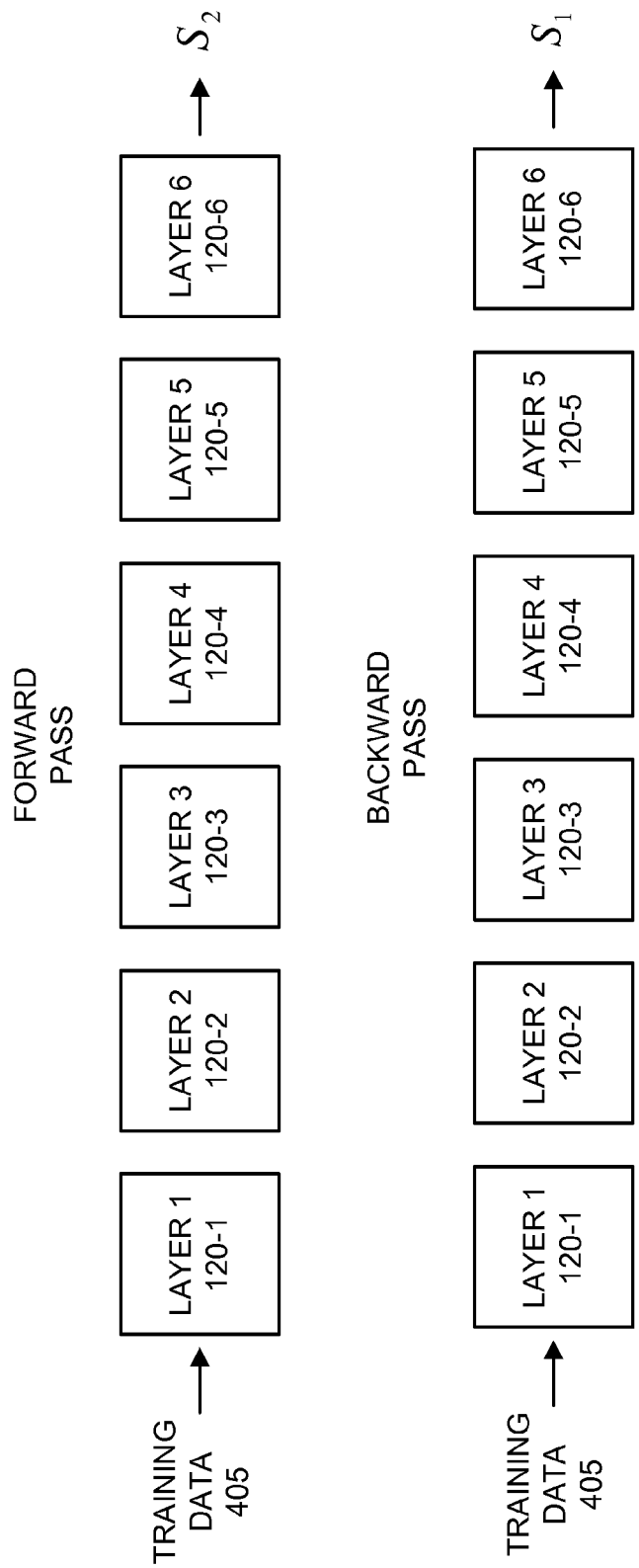
FIG. 4 is a diagram illustrating concepts pertaining to the training of parameters.

Equations (128) through (187) form the basis for updating the s. FIG. 4 is a diagram illustrating concepts pertaining to the training of parameters in relation to training data 405, a forward pass, and a backward pass.

Before providing a further description regarding the forward pass and the backward pass, notations that may be used later are presented.

Training Dataset (TD):

$$X_1=(x_{1,1},x_{1,2},\ldots,x_{1,13},y_1)$$

$$X_2=(x_{2,1},x_{2,2},\ldots,x_{2,13},y_2)$$

$$\ldots$$

$$X_i=(x_{i,1},x_{i,2},\ldots,x_{i,13},y_i)$$

$$\ldots$$

$$X_P=(x_{P,1},x_{P,2},\ldots,x_{P,13},y_P) \quad (194),$$

where $x_{i,j}$ represents the input data, $y_i$ denotes the expected output value, and P is the number of entries of the training dataset.

Coefficient matrix $A$ $$A_{11,13} = \begin{pmatrix} a_{1,1} & a_{1,2} & \cdots & a_{1,14} \\ a_{2,1} & a_{2,2} & \cdots & a_{2,14} \\ \vdots & \vdots & \ddots & \vdots \\ a_{10,1} & a_{10,2} & \cdots & a_{10,14} \end{pmatrix}, \quad (195)$$

where $f_i$ is defined as follows.

$$f_i = a_{i,1}x_1 + a_{i,2}x_2 + \ldots + a_{i,13}x_{13} + a_{i,14} \quad (196)$$

For the membership function at layer 4, $\overline{w}_i$ denotes the i th node output at layer 4. Since $\overline{w}_i$ is functionally dependent on $X_j$, the following expression represents the i th node output at layer 4

$$\overline{w}_i(X_j) = \overline{w}_i(x_{j,1}, x_{j,2}, \ldots, x_{j,13}) \quad (197)$$

A description of the forward pass is provided below. Given $S_1$ (βs for layer 2) and training dataset defined by equation (194), equations formatted as AX=B may be constructed, where X stands for the coefficient matrix given by equation (195). Solving equation (113) gives the fitness solution of the least squares method. The construction of matrices A and B is described.

As previously described, risk engine 115 can be viewed as a function y=F(X), where $X=(x_1,x_2,\ldots,x_{13})$ and $F=\Sigma_{i=1}^{10} f_i \cdot \overline{w}_i$. If equation (196) is plugged into this equation, it yields the following equation.

$$\begin{aligned} y_k &= \sum_{i=1}^{10} (a_{i,1}x_{k,1} + a_{i,2}x_{k,2} + \ldots + a_{i,13}x_{k,13} + a_{i,14}) \cdot \overline{w}_i(X_k) \\ &= \sum_{i=1}^{10} (a_{i,1}x_{k,1}\overline{w}_i(X_k) + a_{i,2}x_{k,2}\overline{w}_i(X_k) + \ldots + \\ &\quad a_{i,13}x_{k,13}\overline{w}_i(X_k) + a_{i,14}\overline{w}_i(X_k)) \end{aligned} \quad (198)$$

This implies that the k th row of matrix A can be written as follows.

$$(v_{k,1} v_{k,2} \ldots v_{k,j} \ldots v_{k,14}) \quad (199)$$

where $v_{k,j}$ is the coefficients for $\langle a_j \rangle = \langle a_{j,1}, a_{j,2}, \ldots, a_{j,14} \rangle$ and may be interpreted as follows.

$$v_{k,j} = \langle x_{k,1}\overline{w}_j(X_k), x_{k,2}\overline{w}_j(X_k), \ldots, x_{k,13}\overline{w}_j(X_k), \overline{w}_j(X_k) \rangle \quad (200)$$

Therefore, matrices A and B may be written as:

$$A = \begin{pmatrix} v_{1,1} & v_{1,2} & \cdots & v_{1,j} & \cdots & v_{1,10} \\ v_{2,1} & v_{2,2} & \cdots & v_{2,j} & \cdots & v_{2,10} \\ \vdots & \vdots & \ddots & \vdots & \vdots & \vdots \\ v_{k,1} & v_{k,2} & \cdots & v_{k,j} & \cdots & v_{k,10} \\ \vdots & \vdots & \vdots & \ddots & \vdots & \vdots \\ v_{P,1} & v_{P,2} & \cdots & v_{P,j} & \cdots & v_{P,10} \end{pmatrix} \quad (201)$$

$$B = \begin{pmatrix} y_1 \\ y_2 \\ \vdots \\ y_k \\ \vdots \\ y_P \end{pmatrix} \quad (202)$$

In view of the above, AX=B can be expressed as:

$$\begin{pmatrix} v_{1,1} & v_{1,2} & \cdots & v_{1,j} & \cdots & v_{1,11} \\ v_{2,1} & v_{2,2} & \cdots & v_{2,j} & \cdots & v_{2,11} \\ \vdots & \vdots & \vdots & \ddots & \vdots & \vdots \\ v_{k,1} & v_{k,2} & \cdots & v_{k,j} & \cdots & v_{k,11} \\ \vdots & \vdots & \vdots & \ddots & \vdots & \vdots \\ v_{P,1} & v_{P,2} & \cdots & v_{P,j} & \cdots & v_{P,11} \end{pmatrix} \begin{pmatrix} a_{1,1} \\ a_{1,2} \\ \vdots \\ a_{1,14} \\ \vdots \\ a_{10,1} \\ a_{10,2} \\ \vdots \\ a_{10,14} \end{pmatrix} = \begin{pmatrix} y_1 \\ y_2 \\ \vdots \\ y_k \\ \vdots \\ y_P \end{pmatrix} \quad (203)$$

where the size of matrix A is P×140, $\{a_{i,j}\}$ is 140×1, and B is P×1.

Applying matrices A of equation (201) and B of equation (202) to the expression $X^* = (A^T A)^{-1} A^T B$ (113), provides the fitness solution of $S_2$. However, in most of the real cases, it becomes ill-defined if $A^T A$ is singular. Therefore, sequential formulas may be used to compute the least squares error for X, where the sequential formulas are given as follows.

$$\begin{cases} X_{i+1} = X_i + S_{i+1}a_{i+1}(b_{i+1} - a_{i+1}^T X_i) \\ S_{i+1} = S_i - \dfrac{A_i a_{i+1} a_{i+1}^T S_i}{1 + a_{i+1}^T S_i a_{i+1}} \\ i = 0, 1, \ldots, P-1, \end{cases} \quad (204)$$

where $a_i^T$ stands for the i th row vector of matrix A defined in equation (201), and $b_i$ stands for the i th entry of B defined in equation (202). $S_i$ represents a covariance matrix, which is defined as $X_0=0$ and $S_0=\gamma I$, where $\gamma$ is a given positive large number and I is the identity matrix. The size of $S_i$ is M×M, A is P×M, X is M×1, and B is Pb×1, where M=140 and P is the number of records of training dataset.

Regarding the backward pass, after identifying parameters in $S_2$, the function signals keep going forward until the error is calculated. Given a training entry $X_i=(x_{i,1}, x_{i,2}, \ldots, x_{i,12}, y_i)$. The error is defined as follows:

$$E_i = \frac{1}{2}(o^i - t^i)^2, \quad (205)$$

where $t^i$ is the i th target output and $o^i$ is the actual output.

The overall error E is defined as $\Sigma_{i=1}^P E_i$. Each parameter $\beta_j$ in $S_1$ may be learned in an iterative manner, which may be defined as follows:

$$\beta_j^{(t+1)} = \beta_j^t - \eta_j \frac{\partial E}{\partial B_j}, \quad (206)$$

where η is a learning rate. Usually, $$\frac{\partial E}{\partial \beta_j}$$

is given as:

$$\frac{\partial E}{\partial \beta_j} = \sum_{i=1}^{P} \frac{\partial E_i}{\partial \beta_j} \qquad (207)$$

$$= \sum_{i=1}^{P} (o^i - t^i) \frac{\partial \sum_k \overline{w}_k f_k}{\partial \beta_j},$$

where $$\frac{\partial \sum_k \overline{w}_k f_k}{\partial \beta_j}$$

is previously described in relation to the gradient descent method and coefficients βs. The following gives the backward pass algorithm for parameter βs. $\Sigma_k \overline{w}_k f_k$ is functional dependent on $X_i$. It implies that $$\sum_{i=1}^{P} (o^i - t^i) \frac{\partial \sum_k \overline{w}_k f_k}{\partial \beta_j} \neq \frac{\partial \sum_k \overline{w}_k f_k}{\partial \beta_j} \cdot \sum_{i=1}^{P} (o^i - t^i).$$

FIG. 5 is a diagram illustrating exemplary components of a device 500 that may correspond to one or more of the devices depicted in the previous figures. For example, device 500 may correspond to components of user device 150, network device 110, network device 111, and/or a network element. As illustrated, according to an exemplary embodiment, device 500 includes a processor 505, memory/storage 510, software 515, a communication interface 520, an input 525, and an output 530. According to other embodiments, device 500 may include fewer components, additional components, different components, and/or a different arrangement of components than those illustrated in FIG. 5 and described herein.

Processor 505 includes one or multiple processors, microprocessors, data processors, co-processors, multi-core processors, application specific integrated circuits (ASICs), controllers, programmable logic devices, chipsets, field programmable gate arrays (FPGAs), system on chips (SoCs), programmable logic devices (PLSs), microcontrollers, application specific instruction-set processors (ASIPs), central processing units (CPUs), or some other component that interprets and/or executes instructions and/or data. Processor 505 may be implemented as hardware (e.g., a microprocessor, etc.) or a combination of hardware and software (e.g., a SoC, an ASIC, etc.). Processor 505 may include one or multiple memories (e.g., memory/storage 510), etc.

Processor 505 may control the overall operation, or a portion of operation(s) performed by device 500. Processor 505 may perform one or multiple operations based on an operating system and/or various applications or programs (e.g., software 515). Processor 505 may access instructions from memory/storage 510, from other components of device 500, and/or from a source external to device 500 (e.g., another device, a network, etc.).

Memory/storage 510 includes one or multiple memories and/or one or multiple other types of storage mediums. For example, memory/storage 510 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 510 may include a hard disk (e.g., a magnetic disk, an optical disk, a magneto-optic disk, a solid state disk, etc.) and a corresponding drive. Memory/storage 510 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 510 may include drives for reading from and writing to the storage medium.

Memory/storage 510 may be external to and/or removable from device 500, such as, for example, a Universal Serial Bus (USB) memory stick, a dongle, a hard disk, mass storage, off-line storage, or some other type of storage medium (e.g., a compact disk (CD), a digital versatile disk (DVD), a Blu-Ray® disk (BD), etc.). Memory/storage 510 may store data, software, and/or instructions related to the operation of device 500.

Software 515 includes an application or a program that provides a function and/or a process. Software 515 may include firmware. For example, with reference to risk engine 115, software 515 may include an application that, when executed by processor 505, provides the functions of risk engine 115, as described herein.

Communication interface 520 permits device 500 to communicate with other devices, networks, systems, and the like. Communication interface 520 includes a wireless interface and/or a wired interface. The wireless interface and the wired interface include, among other components, a transmitter and a receiver. Communication interface 520 may also support various communication protocols, communication standards, etc.

Input 525 provides an input into device 500. For example, input 525 may include a keyboard, a keypad, a touchscreen, a touch pad, a touchless screen, a mouse, an input port, a button, a switch, a microphone, a knob, and/or some other type of input.

Output 530 provides an output from device 500. For example, output 530 may include a display, a speaker, a light (e.g., light emitting diode(s), etc.), an output port, a vibratory mechanism, and/or some other type of output.

Device 500 may perform a function or a process in response to processor 505 executing software instructions stored by memory/storage 510. For example, the software instructions may be stored in memory/storage 510 based on a loading from another memory/storage 510 of device 500 or stored into memory/storage 510 based on a loading from another device via communication interface 520. The software instructions stored in memory/storage 510 may cause processor 505 to perform processes described herein. Alternatively, according to another implementation, device 500 may perform a process or a function based on the execution of hardware (e.g., processor 505, etc.).

Figure 6A:
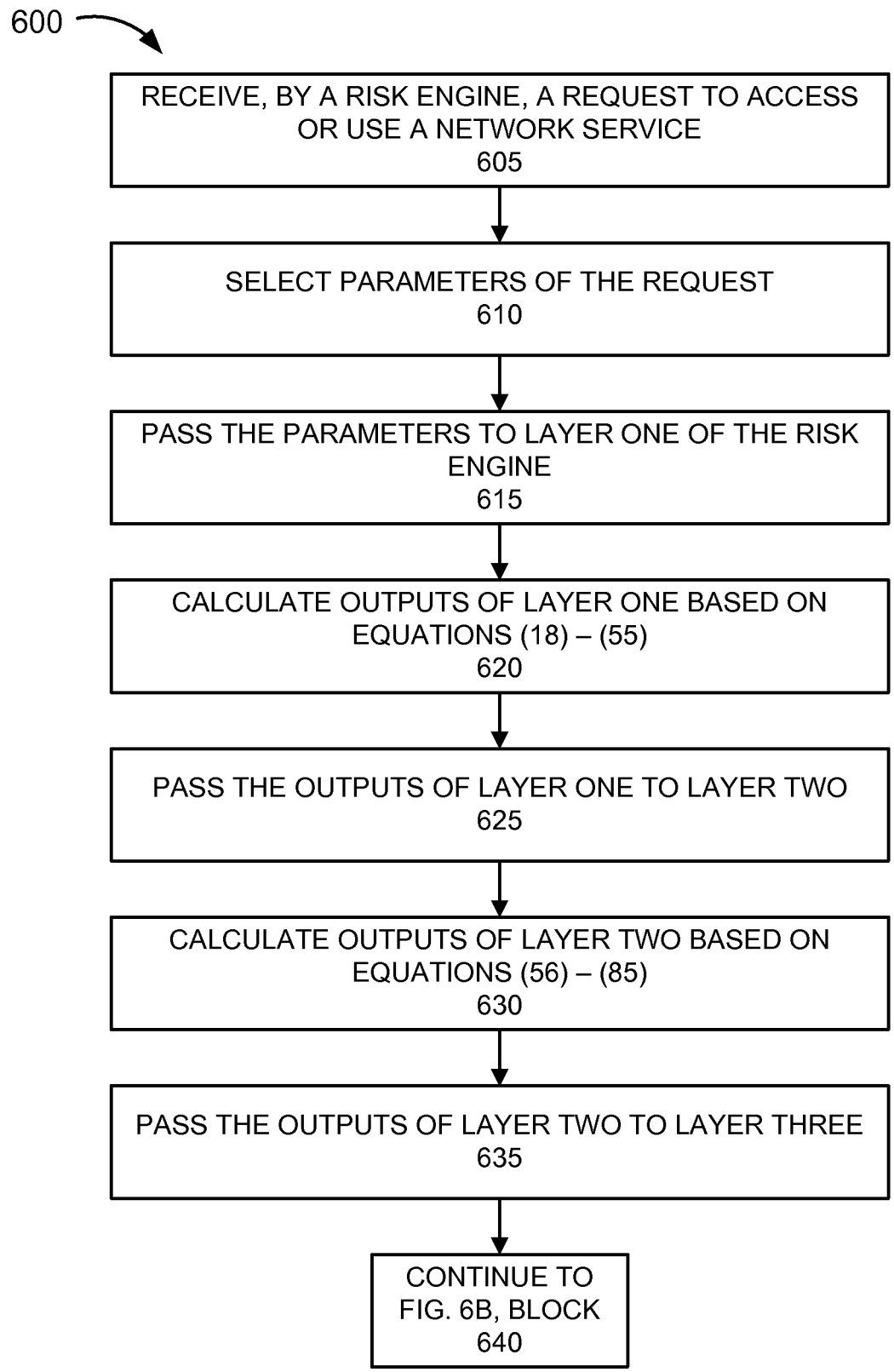
FIGS. 6A-6C are flow diagrams illustrating an exemplary process in which the risk engine calculates a level of risk.
Figure 6B:
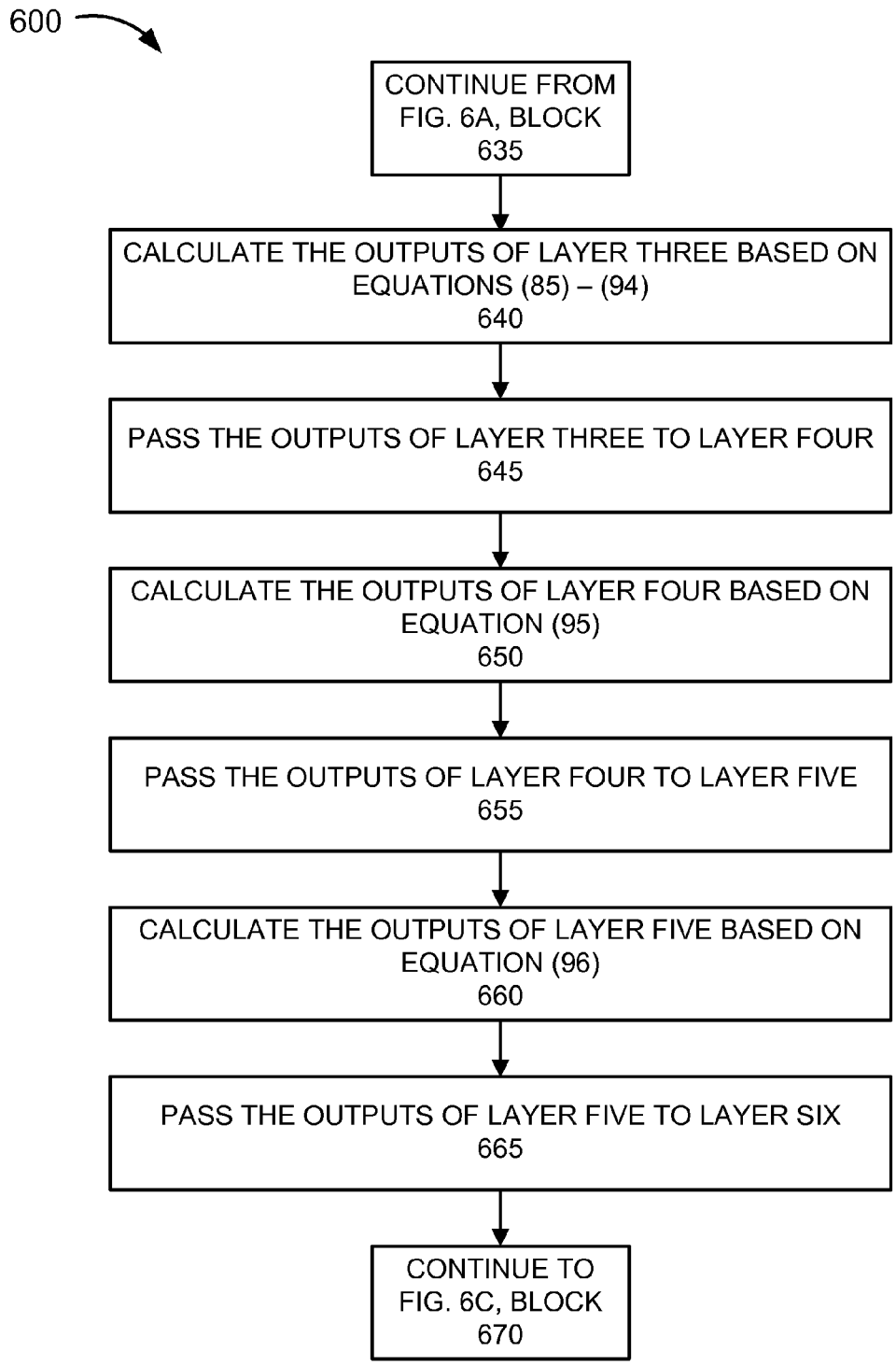
Figure 6C:
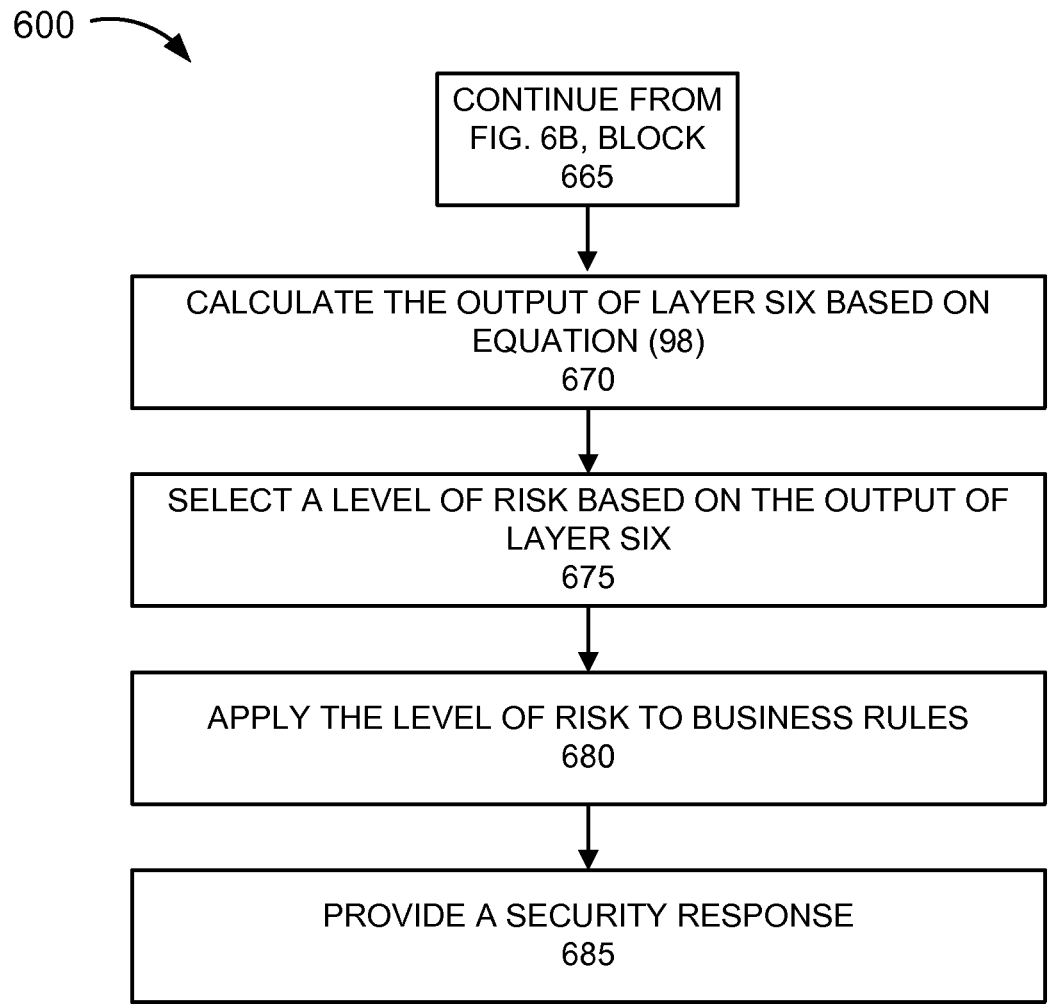

FIGS. 6A-6C are flow diagrams illustrating an exemplary process 600 pertaining to an exemplary embodiment of risk engine 115 calculating a level of risk. A step described in process 600 is performed by risk engine 115 of network device 111. The description of process 600 may refer to previous figures and/or equations. For purposes of description, it may be assumed that parameters $S_1$ and $S_2$ have been previously calculated.

Referring to FIG. 6A, in block 605, process 600 begins with receiving a request to access or use a network service. For example, as previously described, user device 150 transmits a request to access or use a service or an asset provided by network devices 110. The request is received by risk engine 115 of network device 111.

In block 610, parameters of the request are selected. For example, as previously described, risk engine 115 selects parameters of the request pertaining to the IP address from which the request is received, a timestamp associated with the request, a user identifier, an indication of whether the request is received within one session, the location of the user, nature of the request (e.g., whether the request is to update, reset, etc., username, password, one-time password device, etc.), an identifier of the one-time password device for the user, whether the one-time password is correct, and whether the request is an idle or unsuccessful request.

In block 615, the parameters are passed to layer 1 of the risk engine. For example, the parameters are passed to nodes 121 of layer 1 120-1. As previously described, node 121-1 receives the input of the IP address and the timestamp associated with the request; node 121-2 receives the input of the user identifier and the timestamp associated with the request; nodes 121-3 and 123-4 receives the input of the user identifier; node 121-5 receives the input of the user identifier, the timestamp associated with the request, and the indication of whether the request is received within one session; node 121-6 receives the input of the user identifier and the location of the user; node 121-7 receives the input of the user identifier, the location of the user, and the timestamp associated with the request; node 121-8 receives the input of the user identifier and the timestamp associated with the request that indicates the user updates, resets, etc., a username, password, etc.; node 121-9 receives the input of the user identifier and the timestamp of a request that indicates the user updates, adds, etc., a one-time password device; node 121-10 receives the input of the user identifier, an identifier of the user's one-time password device, and the timestamp associated with the request; node 121-11 receives the input of the user identifier, an indication whether the one-time password entered is correct, and the timestamp associated with the request; node 121-12 receives the IP address associated with the request, an indication of whether the request is an idle or unsuccessful request, and a timestamp associated with the request; and node 121-13 receives the user identifier and the current user location.

In block 620, outputs of layer 1 are calculated based on equations (18)-(55). For example, node 121-1 calculates the output AI based on the inputs of block 615 and equations (18)-(21); node 121-2 calculates the output AU based on the inputs of block 615 and equations (22)-(25); node 121-3 calculates the output $$p_{i,j} = \frac{a_{i,j}}{\sum a_{i,j}}$$

based on the input of block 615 and matrix of equation (26); node 121-4 calculates the output of $$p_i = \frac{b_i}{\sum b_i}$$

based on the input of block 615 and equation (27); node 121-5 calculates the output of $$p = \exp\left(-\frac{1}{2}\left(\frac{(t_d - \bar{t})}{\sigma_t}\right)^2\right)$$

based on the inputs of block 615 and the equations (28)-(30); node 121-6 calculates the output of $$f_{g2d}(x, y) = A \cdot \exp\left(-\left(\frac{(x - \bar{x})^2}{2\sigma_x^2} + \frac{(y - \bar{y})^2}{2\sigma_y^2}\right)\right)$$

based on the inputs of block 615 and equations (31)-(33); node 121-7 calculates the output of $$S = \frac{D_{c,p}}{\delta t}$$

based on the inputs of block 615, equation (34), and the geolocation of a previous request; node 121-8 calculates the output of AP based on the inputs of block 615 and equations (35)-(38); node 121-9 calculates the output of AO based on the inputs of block 615 and equations (39)-(42); node 121-10 calculates the output of AOU based on the inputs of block 615 and equations (43)-(46); node 121-11 calculates the output of AOA based on the inputs of block 615 and equations (47)-(50); node 121-12 calculates the output of AOI based on the inputs of block 615 and equations (51)-(54); and node 121-13 calculates the output of p based on the inputs of block 615 and equation (55).

In block 625, outputs of layer 1 are passed to layer 2. For example, as previously described, the outputs of nodes 121-1 through nodes 121-13 are passed to nodes 122-1 through nodes 122-24 of layer 2 120-2 in accordance with Table 1.

In block 630, outputs of layer 2 are calculated based on equations (56)-(85). As previously described, each node 122 of layer 2 is a square node that includes the node function $O_i = \mu_{A_i}(x)$, in which x is the input to node i, and $A_i$ is the linguistic label associated with this node's function. $O_i$ is the membership function of $A_i$ and it specifies the degree to which the given x satisfies the quantifier $A_i$. For example, regarding node 122-1, the membership function of $O_i$ indicates the degree in which the frequency of requests coming from the IP address associated with the request, is high; regarding node 122-2, the membership function of $O_2$ indicates the degree in which the frequency of requests coming from the IP address associated with the request, is low, and so on, as in accordance with the linguistic labels and equations (56)-(85).

In block 635, outputs of layer 2 are passed to layer 3. For example, as previously described, the outputs of nodes 122-1 through nodes 122-24 are passed to nodes 123-1 through nodes 123-10 of layer 3 120-3 according to the edge descriptions.

Referring to FIG. 6B, in block 640, outputs of layer 3 are calculated based on equations (85)-(94). For example, as previously described, each node 123 applies one of rules $R_1$ through $R_{10}$ and includes a T-norm function in accordance with equations (85)-(94).

In block 645, outputs of layer 3 are passed to layer 4. For example, as previously described, the outputs of nodes 123-1 through nodes 123-10 are passed to nodes 124-1 through nodes 124-10 of layer 4 120-4.

In block 650, outputs of layer 4 are calculated based on equation (95). For example, each node 124 applies equation (95) to calculate $\bar{w}_i$.

In block 655, outputs of layer 4 are passed to layer 5. For example, as previously described, the outputs of nodes 124-1 through nodes 124-10 are passed to nodes 125-1 through nodes 125-10 of layer 5 120-5.

In block 660, outputs of layer 5 are calculated based on equation (96). For example, as previously described, each node 125 of layer 5 120-5 is a square node with a node function $O_i^5 = \overline{w}_i \cdot f_i = \overline{w}_i(\Sigma_j a_{i,j} x_j + c_i)$ in which $\overline{w}_i$ is the output of the ith node in layer 4 $x_j$ is the output of the j th node in layer 1; and $(a_{i,j}, c_i)$ represents the parameter set.

In block 665, outputs of layer 5 are passed to layer 6. For example, each node 125 outputs $\overline{w}_i \cdot f$ to node 126 of layer 6 120-6.

Referring to FIG. 6C, in block 670, output of layer 6 is calculated based on equation (98). For example, as previously described, node 126 calculates an output in accordance with the equation $$O_1^6 = \left(upCoef \cdot \frac{1 - e^{-beta(c-1)}}{1 + e^{-beta(c-1)}} + lowCoef\right) \cdot \sum_i \overline{w}_i f_i,$$

which accounts for lower than expected values due to the normalization of layer 4.

In block 675, a level of risk is selected based on the output of layer 6. Network device 111 assigns a level of risk based on the output of layer 6. For example, the level of risk may be assigned a value of low, medium, or high. Alternatively, a finer granularity of risk may be assigned (e.g., extremely low, very high, etc.).

In block 680, the level of risk is applied to business rules. For example, network device 111 applies a set of business rules to the level of risk. The service provider may configure the rules to provide a security response corresponding to the level of risk. For example, for a request deemed to have a low risk value, a business rule may indicate that access to the service or the asset should be granted.

In block 685, a security response is provided. For example, network device 111 provides a security response corresponding to the level of risk. By way of example, the security response may be one of granting access, denying access, or providing further challenges to the user of user device 150.

Although FIGS. 6A-6C illustrate an exemplary process 600 to calculate a level of risk, according to other embodiments, process 600 may include additional operations, fewer operations, and/or different operations than those illustrated in FIGS. 6A-6C, and described herein.

As previously described, parameter S denotes a set of parameters used by risk engine 115 in which S can be decomposed into two sets according to equation (99) ($S = S_1 \oplus S_2$), in which $S_1$ represents all the βs of layer 2 and $S_2$ represents $(a_{i,j}, c_i)$ of layer 5.

Figure 7:
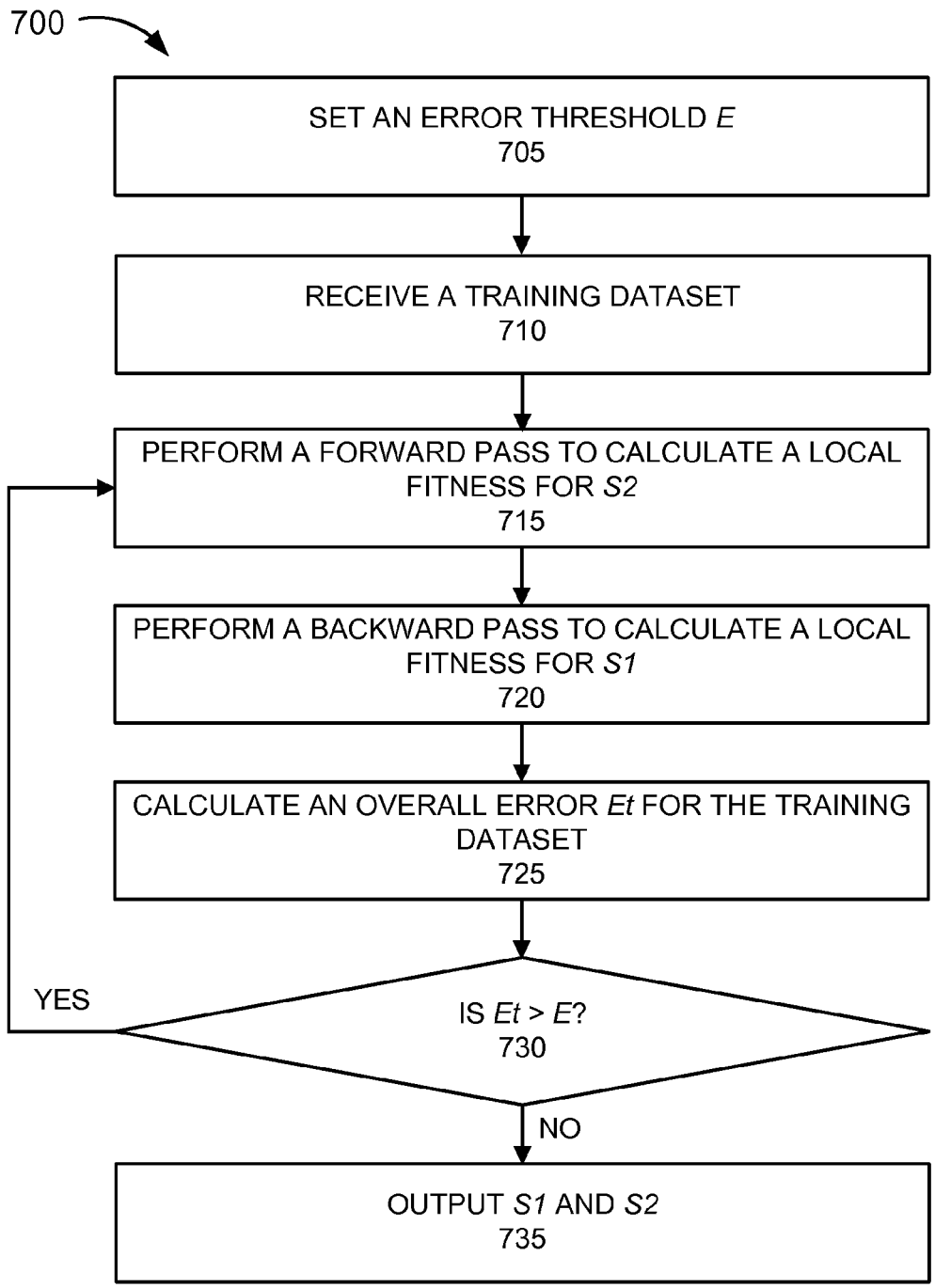
FIG. 7 is a flow diagram illustrating an exemplary process in which the parameters $S_1$ and $S_2$ are calculated.

FIG. 7 is a flow diagram illustrating an exemplary process 700 in which the parameters $S_1$ and $S_2$ are calculated. A step described in process 700 is performed by risk engine 115 of network device 111. The description of process 700 may refer to previous figures and/or equations. It may be assumed for training purposes that the unknown parameters $S_1$ (e.g., parameter β for layer 2) and $S_2$ (e.g., parameters a and c of layer 5) may be assigned an initial value to allow the forward pass and the backward pass to be performed.

Process 700 may begin, in block 705, setting an error threshold ε. For example, network device 111 may receive a threshold error value (e.g., ε>0) to be used as a basis for calculating parameters $S_1$ and $S_2$. By way of further example, the error threshold g may be between 0 and 1.

In block 710, a training dataset is received. For example, network device 111 may receive a training dataset that includes multiple records (e.g., $X_1, \ldots, X_i, \ldots, X_P$), in which P is the number of records. For example, each record may include the following format $X_1 = (x_{1,1}, x_{1,2}, \ldots, x_{1,13}, y_1)$.

In block 715, a forward pass to calculate a local fitness $S_2$ is performed. For example, as previously described, network device 111 performs a forward pass to train and identify values for the membership function of layer 5. In particular, the forward pass training identifies the values for $S_2$, which correspond to the set of values for a and c of the membership equation of layer 5. Referring back to equations (201)-(203) and the expression AX=B, matrix A includes for each v the data of equation (200), in which $X_k$ is a data instance or field of $X_k$ data record included in the training data, $\overline{w}_j$ is the output from layer 4, and $X_k$ corresponds to the training data record. Matrix B includes the expected output y of the training data, and matrix X includes the unknown variables a and c (i.e., $S_2$). More specifically, matrices A and B can be obtained by equations (200)-(202) when a forward pass calculation reaches layer 5. Then, iteratively solving equation (204) gives the wanted results of $S_2$.

In block 720, a backward pass to calculate a local fitness $S_l$ is performed. For example, as previously described, network device 111 performs a backward pass to train and identify values for the node functions of nodes 122 of layer 2. In particular, the backward pass training identifies the values for $S_1$, which correspond to the set of values for βs as previously described in relation to equations (205)-(207). As previously explained, for each training iteration, there are two steps; a forward pass to calculate $S_2$ and a backward pass to calculate $S_1$. The backward pass occurs after the forward pass. After the forward pass identifies $S_2$, equation 206 is used multiple times to calculate each β in $S_1$ for the node functions of nodes 122 of layer 2.

In block 725, an overall error $e_t$ is calculated for the training dataset. For example, network device 111 calculates an overall error $e_t$ of the training dataset, in which $e_t$ may be expressed as $$e_t = \left(\sum (o_i y_i)^2\right)^{\frac{1}{2}}$$

or $e_t = \max|o_i y_i|$, where $o_i$ is the output of the fuzzy neural network (e.g., layers 1 through layer 6) and y is expected output defined in the training dataset.

In block 730, it is determined whether $e_t > \epsilon$. For example, network device 111 determines whether $e_t > \epsilon$. If it is determined that $e_t > \epsilon$ (block 730 YES), then process 700 continues to block 715. That is, if network device 111 determines $e_t > \epsilon$, then network device 111 performs another forward pass, as provided in block 715.

If it is determined that $e_t$ is not greater than 8 (block 730-NO), then the parameters $S_1$ and $S_2$ are output (block 735). That is, if network device 111 determines that $e_t \leq \epsilon$, then network device 111 outputs the values for $S_1$ and $S_2$.

Although FIG. 7 illustrates an exemplary process 700 to calculate parameters $S_1$ and $S_2$, according to other embodiments, process 700 may include additional operations, fewer operations, and/or different operations than those illustrated in FIG. 7, and described herein.

Figure 8:
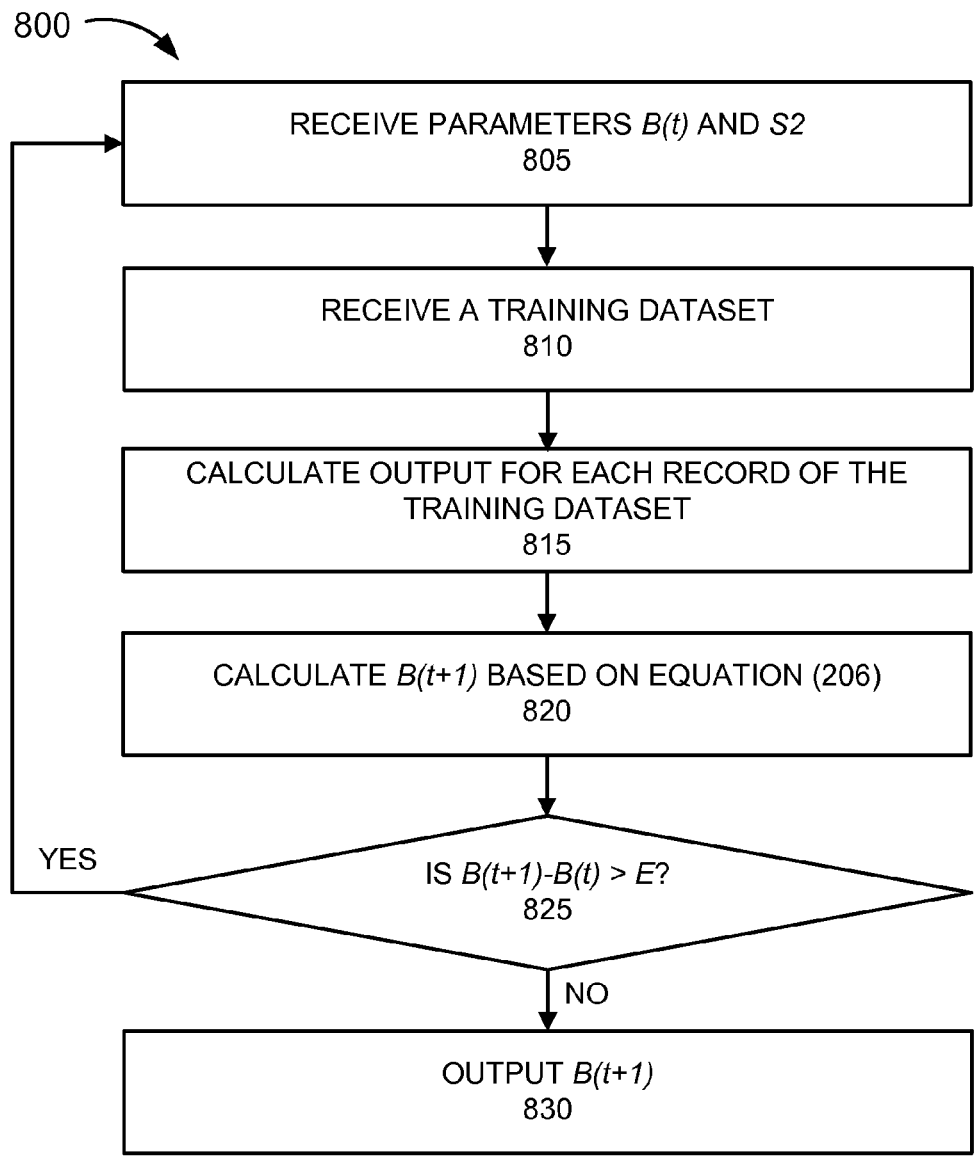
FIG. 8 is a flow diagram illustrating an exemplary process in which the parameter $\beta$ is calculated.

FIG. 8 is a flow diagram illustrating an exemplary process 800 in which parameter βs are calculated for the backward pass. A step described in process 800 is performed by risk engine 115 of network device 111. The description of process 800 may refer to previous figures and/or equations. In the backward pass, the error rates propagate from the output end toward the input end, and the parameters in $S_1$ are updated by the gradient method.

Process 800 may begin, in block 805, with receiving parameters β(t) and $S_2$. For example, network device 111 receives parameters $β_j^t$ and $S_2$. In this case, the parameters $S_2$ have been calculated based on the training resulting from the forward pass. However, the parameters $β_j^t$ may correspond to initial values for a first iteration of process 800.

In block 810, a training dataset is received. For example, network device 111 may receive a training dataset that includes multiple records (e.g., $X_1, \ldots, X_i, \ldots, X_P$), in which P is the number of records. For example, each record may include the following format $X_1=(x_{1,1}, x_{1,2}, \ldots, x_{1,13}, y_1)$.

In block 815, an output for each record of the training dataset is calculated. For example, each record of training data $X_i$ is applied to network device 111, in which a series of computations are calculated from layer 1 to layer 6. At layer 6, an actual output $o^i$ for each record of training data is calculated.

In block 820, the parameter $β_j^{(t+1)}$ is calculated. For example, network device 111 applies a backward pass, which uses equation (206) to calculate $β_j^{(t+1)}$ based on the previous value $β^{(t)}$.

In block 825, it is determined whether $|β^{(t+1)}_j - β^{(t)}_j| > ε$. For example, network device 111 determines whether $|β^{(t+1)}_j - β^{(t)}_j| > ε$, in which ε is a given nonzero number. For each parameter $β_j$ in $S_1$, a threshold ε>0 is defined.

If it is determined that $|β^{(t+1)}_j - β^{(t)}_j| > ε$(block 825-YES), then process 800 continues to block 805. That is, network device 111 continues with another iteration of process 800.

If it is determined that $|β^{(t+1)}_j - β^{(t)}_j| ≤ ε$ (block 825-NO), then $β^{(t+1)}_j$ is output. For example, network device 111 outputs $β_j^{(t+1)}$ as an instance of parameter $S_1$.

Although FIG. 8 illustrates an exemplary process 800 to calculate parameters β, according to other embodiments, process 800 may include additional operations, fewer operations, and/or different operations than those illustrated in FIG. 8, and described herein.

The foregoing description of embodiments provides illustration, but is not intended to be exhaustive or to limit the embodiments to the precise form disclosed. For example, in the preceding specification, various embodiments have been described with reference to the accompanying drawings. However, various modifications and changes may be made thereto, and additional embodiments may be implemented, without departing from the broader scope of the invention as set forth in the claims that follow. For example, although an embodiment has been described in relation to risk engine evaluating a risk with respect to access of a service or an asset, the risk engine may have broader applications to assess risk. The specification and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 6A-6C, 7, and 8, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware or hardware. For example, a process or a function may be implemented as "logic" or as a "component." This logic or this component may include hardware (e.g., processor 505, etc.) or a combination of hardware and software (e.g., software 515). The embodiments have been described without reference to the specific software code since software can be designed to implement the embodiments based on the description herein.

Additionally, embodiments described herein may be implemented as a non-transitory storage medium that stores data and/or information, such as instructions, program code, data structures, program modules, an application, etc. For example, a non-transitory storage medium includes one or more of the storage mediums described in relation to memory/storage 510. The data and/or information may be executed to perform processes or provide functions, as described herein.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

No element, act, or instruction described in the present application should be construed as critical or essential to the embodiments described herein unless explicitly described as such.

What is claimed is:

1. A method comprising:
 receiving, by a device, a request to access a service or an asset;
 obtaining, by the device, parameters pertaining to the request, wherein the parameters include a user identifier that identifies a user from which the request originates, a network address of a user device associated with the user, and whether the request is an idle request;
 evaluating, by the device, a level of risk associated with the request, wherein the evaluating comprises:
  using the parameters as input to membership functions, wherein the outputs of the membership functions indicate degrees of respective states in relation to the user's attempted access of the service or the asset;
  applying the outputs of the membership functions to T-norm functions and application of rules that indicate levels of risk based on the respective states;
  normalizing the outputs from the T-norm functions;
  generating intermediary outputs based on normalized outputs and values associated with the parameters; and
  outputting the level of risk based on the intermediary outputs; and outputting, by the device, a security response based on the level of risk associated with the request.

2. The method of claim 1, wherein the rules include a first rule that indicates if a frequency of requests coming from a certain network address is high and a frequency of idle requests is high, then a risk is a high level; a second rule that indicates if the frequency of requests coming from a certain user is high, then the risk is the high level; a third rule that indicates if the request originate from an unusual location, then the risk is a medium level; a fourth rule that indicates if the request is received at an unusual time based on historical data, then the risk is a medium level; a fifth rule that indicates if a moving speed of the user is beyond a threshold value, then the risk is high; a sixth rule that indicates if a frequency of updating a user profile of the user is high, then a risk is high; a seventh rule that indicates if a frequency of updating a one-time password device is high, then the risk is high; an eighth rule that indicates if a one-time password verification fails multiple times, then the risk is high, and a ninth rule that indicates if the user changes the one-time password device multiple times, then the risk is high.

3. The method of claim 1, wherein the respective states include a first state in which a frequency of requests coming from the network address is high; a second state in which the frequency of requests coming from the network address is low; a third state in which a frequency of requests coming from the user is high; a fourth state in which a frequency of requests coming from the user is low; a fifth state in which, given the network address, a frequency of idle requests is high; and a sixth state in which, given the network address, a frequency of idle requests is low.

4. The method of claim 1, wherein the parameters include a timestamp associated with the request, an indication of whether the request is received within one session, a location of the user, a nature of the request, an identifier of a one-time password device for the user, and whether a one-time password is correct.

5. The method of claim 1, further comprising:
outputting from a preprocessing function, based on an input indicating whether the request is the idle request, a value indicating a frequency of requests, from the network address, which are idle over a time frame;
inputting into one of the membership functions, an output from the preprocessing function.

6. The method of claim 1, wherein the outputting the level of risk further comprises:
multiplying an upper coefficient and a lower coefficient, respectively, to a summation of the intermediary outputs.

7. The method of claim 1, wherein the T-norm functions include a multiplicative function and an identity function.

8. The method of claim 1, wherein the outputting the security response includes one of denying access to the user, granting access to the user, or providing a challenge to the user.

9. A system comprising:
a transmitter and a receiver;
a memory, wherein the memory stores instructions; and
a processor, wherein the processor executes the instructions to:
receive, via the receiver, a request to access a service or an asset;
obtain parameters pertaining to the request, wherein the parameters include a user identifier that identifies a user from which the request originates, a network address of a user device associated with the user, and whether the request is an idle request;
evaluate a level of risk associated with the request, wherein an evaluation of the level of risk comprises to:
use the parameters as input to membership functions, wherein the outputs of the membership functions indicate respective states in relation to the user's attempted access of the service or the asset;
apply the outputs of the membership functions to T-norm functions and application of rules that indicate levels of risk based on the respective states;
normalize the outputs from the T-norm functions;
generate intermediary outputs based on normalized outputs and values associated with the parameters; and
output the level of risk based on a summation of the intermediary outputs; and
output, via the transmitter, a security response based on the level of risk associated with the request.

10. The device of claim 9, wherein the rules include a first rule that indicates if a frequency of requests coming from a certain network address is high and a frequency of idle requests is high, then a risk is a high level; a second rule that indicates if the frequency of requests coming from a certain user is high, then the risk is the high level; a third rule that indicates if the request originate from an unusual location, then the risk is a medium level; a fourth rule that indicates if the request is received at an unusual time based on historical data, then the risk is a medium level; a fifth rule that indicates if a moving speed of the user is beyond a threshold value, then the risk is high; a sixth rule that indicates if a frequency of updating a user profile of the user is high, then a risk is high; a seventh rule that indicates if a frequency of updating a one-time password device is high, then the risk is high; an eighth rule that indicates if a one-time password verification fails multiple times, then the risk is high, and a ninth rule that indicates if the user changes the one-time password device multiple times, then the risk is high.

11. The device of claim 9, wherein the respective states include a first state in which a frequency of requests coming from the network address is high; a second state in which the frequency of requests coming from the network address is low; a third state in which a frequency of requests coming from the user is high; a fourth state in which a frequency of requests coming from the user is low; a fifth state in which, given the network address, a frequency of idle requests is high; and a sixth state in which, given the network address, a frequency of idle requests is low.

12. The device of claim 9, wherein the parameters include a timestamp associated with the request, an indication of whether the request is received within one session, a location of the user, a nature of the request, an identifier of a one-time password device for the user, and whether a one-time password is correct.

13. The device of claim 9, wherein the processor executes the instruction to:
output from a preprocessing function, based on an input indicating whether the request is the idle request, a value indicating a frequency of requests, from the network address, which are idle over a timeframe; and
input into one of the membership functions, an output from the preprocessing function.

14. The device of claim 9, wherein, when outputting the level of risk, the processor executes the instruction to:
multiply an upper coefficient and a lower coefficient, respectively, to the summation.

15. The device of claim 9, wherein the T-norm functions include a multiplicative function and an identity function.

16. The device of claim 9, wherein the processor executes the instruction to:
apply a value of the level of risk to a set of business rules; and wherein, when outputting the security response, the processor executes the instructions to:
output the security response based on an application of the set of business rules to the value of the level of risk, wherein the security response includes one of denying access to the user, granting access to the user, or providing a challenge to the user.

17. A non-transitory storage medium that stores instructions executable by a computational device, wherein the instructions comprise instructions to:
receive a request to access a service or an asset;
obtain parameters pertaining to the request, wherein the parameters include a user identifier that identifies a user from which the request originates, a network address of a user device associated with the user, and whether the request is an idle request;
evaluate a level of risk associated with the request, wherein the instructions to evaluate comprise instructions to:
use the parameters as input to membership functions, wherein the outputs of the membership functions indicate degrees of respective states in relation to the user's attempted access of the service or the asset;
apply the outputs of the membership functions to T-norm functions and application of rules that indicate levels of risk based on the respective states;
normalize the outputs from the T-norm functions;
generate intermediary outputs based on normalized outputs and values associated with the parameters; and
output the level of risk based on a summation of the intermediary outputs; and
output a security response based on the level of risk associated with the request.

18. The non-transitory storage medium of claim 17, wherein the rules include a first rule that indicates if a frequency of requests coming from a certain network address is high and a frequency of idle requests is high, then a risk is a high level; a second rule that indicates if the frequency of requests coming from a certain user is high, then the risk is the high level; a third rule that indicates if the request originate from an unusual location, then the risk is a medium level; a fourth rule that indicates if the request is received at an unusual time based on historical data, then the risk is a medium level; a fifth rule that indicates if a moving speed of the user is beyond a threshold value, then the risk is high; a sixth rule that indicates if a frequency of updating a user profile of the user is high, then a risk is high; a seventh rule that indicates if a frequency of updating a one-time password device is high, then the risk is high; an eighth rule that indicates if a one-time password verification fails multiple times, then the risk is high, and a ninth rule that indicates if the user changes the one-time password device multiple times, then the risk is high.

19. The non-transitory storage medium of claim 17, wherein the respective states include a first state in which a frequency of requests coming from the network address is high; a second state in which the frequency of requests coming from the network address is low; a third state in which a frequency of requests coming from the user is high; a fourth state in which a frequency of requests coming from the user is low; a fifth state in which, given the network address, a frequency of idle requests is high; and a sixth state in which, given the network address, a frequency of idle requests is low.

20. The non-transitory storage medium of claim 17, wherein the parameters include a timestamp associated with the request, and at least one of an indication of whether the request is received within one session, a location of the user, a nature of the request, an identifier of a one-time password device for the user, or whether a one-time password is correct.

* * * * *